US012195029B2

(12) United States Patent
Sumikawa et al.

(10) Patent No.: US 12,195,029 B2
(45) Date of Patent: *Jan. 14, 2025

(54) DRIVER ASSISTANCE APPARATUS AND COMPUTER-READABLE RECORDING MEDIUM

(71) Applicant: SUBARU CORPORATION, Tokyo (JP)

(72) Inventors: Ryuichi Sumikawa, Tokyo (JP); Takeshi Torii, Tokyo (JP); Hideyuki Takao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 18/065,842

(22) Filed: Dec. 14, 2022

(65) Prior Publication Data

US 2023/0219591 A1 Jul. 13, 2023

(30) Foreign Application Priority Data

Jan. 13, 2022 (JP) .................................. 2022-003489

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2050/143* (2013.01)

(58) Field of Classification Search
CPC ................ B60W 50/14; B60W 40/09; B60W 2050/143; B60W 2520/125; B60W 2540/22; B60W 2540/30
See application file for complete search history.

(56) References Cited

U.S. PATENT DOCUMENTS 12,073,735 B2 * 8/2024 Sumikawa ........... G09B 19/167
12,077,466 B2 * 9/2024 Chen ..................... C03B 37/029

FOREIGN PATENT DOCUMENTS

JP 2012-198344 A 10/2012

* cited by examiner

*Primary Examiner* — Nabil H Syed
*Assistant Examiner* — Cal J Eustaquio
(74) *Attorney, Agent, or Firm* — Rimon P.C.

(57) ABSTRACT

A driver assistance apparatus includes: one or more processors; and one or more memories communicably coupled to the one or more processors. The one or more processors set a control mode of outputting a sound, to a first or second output control mode depending on a predetermined determination condition. The first output control mode includes outputting the sound continuously during travel of a vehicle, while changing the sound with magnitude of behavior of the vehicle. The second output control mode includes outputting, each time the vehicle travels through a predetermined segment of a planned travel route of the vehicle, a reward sound corresponding to stability of the behavior of the vehicle in the predetermined segment traveled. The one or more processors carry out processing of outputting the sound in the first or second output control mode set.

5 Claims, 18 Drawing Sheets

| | | | | |
|---|---|---|---|---|
| DRIVER ATTRIBUTE DATA | AGE OF DRIVER | AGED | UPPER LIMIT VALUE: LARGE | KINDS OF DATA: FEWER |
| | THE NUMBER OF YEARS SINCE LICENSING | LONG YEARS ↕ NOT MANY YEARS | UPPER LIMIT VALUE: SMALL ↕ UPPER LIMIT VALUE: LARGE | KINDS OF DATA: MORE ↕ KINDS OF DATA: FEWER |
| | HOW OFTEN THE DRIVER DRIVES | VERY OFTEN ↕ NOT OFTEN | UPPER LIMIT VALUE: SMALL ↕ UPPER LIMIT VALUE: LARGE | KINDS OF DATA: MORE ↕ KINDS OF DATA: FEWER |
| | BLANK PERIOD | LONG YEARS | UPPER LIMIT VALUE: LARGE | KINDS OF DATA: FEWER |
| TRAVELING ENVIRONMENT DATA | MANY PEDESTRIANS OR BICYCLES HEAVY TRAFFIC SCHOOL ROUTE OR COMMUTING HOURS SMALL ROAD WIDTH | HIGH DEGREE OF RISK | UPPER LIMIT VALUE: SMALL | KINDS OF DATA: MORE |
| | HEAVY RAINFALL OR SNOWFALL HIGH WIND SPEED SNOWPACK FROZEN ROAD SURFACE | HIGH DEGREE OF RISK | UPPER LIMIT VALUE: SMALL | KINDS OF DATA: MORE |

FIG. 3

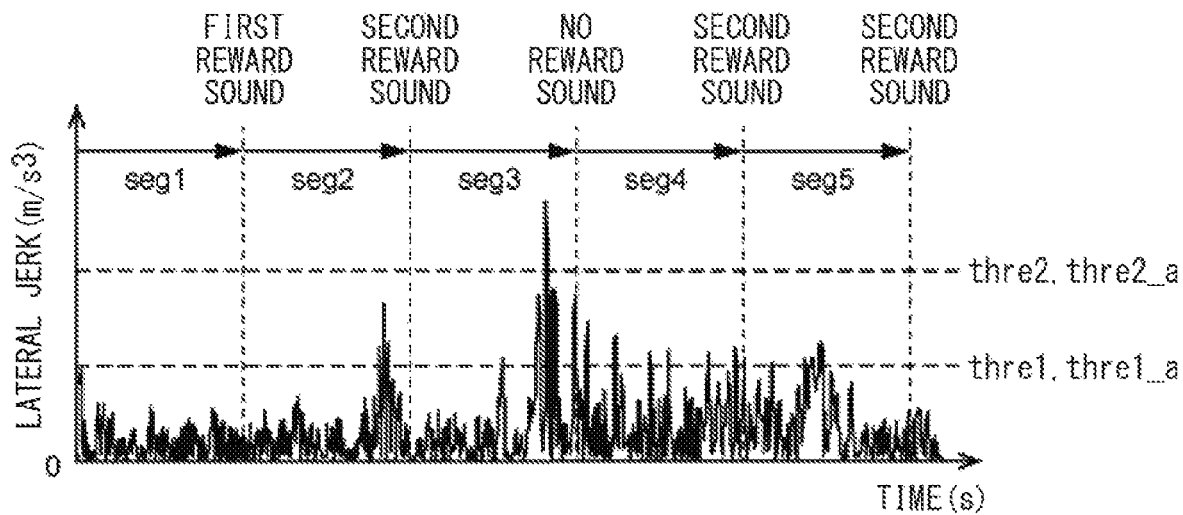

FIG. 7

| REWARD SOUND | FIRST REWARD SOUND | SECOND REWARD SOUND |
|---|---|---|
| SOUND OF WINNING MEDALS | THE NUMBER OF MEDALS TO BE WON = TWO | THE NUMBER OF MEDALS TO BE WON = ONE |
| SOUND OF APPLAUSE | THE NUMBER OF PEOPLE APPLAUDING = TWO OR MORE | THE NUMBER OF PEOPLE APPLAUDING = ONE |
| SOUND OF FIREWORKS | THE NUMBER OF FIREWORKS = TWO OR MORE | THE NUMBER OF FIREWORKS = ONE |
| CHORD | THE NUMBER OF NOTES = FIVE | THE NUMBER OF NOTES = THREE |

FIG. 8

DRIVER ASSISTANCE APPARATUS AND COMPUTER-READABLE RECORDING MEDIUM

CROSS-REFERENCE TO RELATED APPLICATIONS

The present application claims priority from Japanese Patent Application No. 2022-003489 filed on Jan. 13, 2022, the entire contents of which are hereby incorporated by reference.

BACKGROUND

The disclosure relates to a driver assistance apparatus and a computer-readable recording medium containing a computer program that assist in driving a vehicle.

The technical level of vehicle driving operations varies from driver to driver. The technical level of driving operations influences ride comfort and traffic safety. Thus, various proposals have been made for devices that determine a driving operation of a vehicle, notify a driver of a determination result of the driving operation, or provides the driver with advice.

For example, Japanese Unexamined Patent Application Publication (JP-A) No. 2012-198344 proposes a driver assistance apparatus that accurately determines a driving operation state, making it possible for a driver to get information regarding an overall evaluation of a driving operation state during a current drive, and to improve techniques of driving operations for the next drive. For example, JP-A No. 2012-198344 discloses a driver assistance apparatus including an amount-of-change calculation unit, a jerk calculation unit, a state determination unit, and an overall determination unit. The amount-of-change calculation unit calculates a first related value related to an amount of change in an acceleration rate. The jerk calculation unit calculates a second related value related to a jerk. The state determination unit makes a determination as to whether the vehicle is a flexible driving state or whether the vehicle is a loose driving state, on the basis of the first and second related values, in accordance with a determination criterion set in advance using a vibration model. The overall determination unit calculates a score for a determination result by the state determination unit during the current drive, calculates a first evaluation index by dividing the score by the number of times the state determination unit makes the determination during the current drive, and calculates an overall evaluation score of the driving operation state during the current drive on the basis of the first evaluation index.

SUMMARY

An aspect of the disclosure provides a driver assistance apparatus configured to output a sound corresponding to behavior of a vehicle, The driver assistance apparatus includes: one or more processors; and one or more memories communicably coupled to the one or more processors. The one or more processors are configured to set a control mode of outputting the sound, to a first output control mode or a second output control mode depending on a predetermined determination condition. The first output control mode includes outputting the sound continuously during travel of the vehicle, while changing the sound with magnitude of the behavior of the vehicle. The second output control mode includes outputting, each time the vehicle travels through a predetermined segment of a planned travel route of the vehicle, a reward sound corresponding to stability of the behavior of the vehicle in the predetermined segment traveled. The one or more processors are configured to carry out processing of outputting the sound in the first output control mode or the second output control mode set.

An aspect of the disclosure provides a computer-readable recording medium containing a program applicable to a driver assistance apparatus configured to output a sound corresponding to behavior of a vehicle. The program causes, when executed by one or more processors, the one or more processors to implement processing. The processing includes setting a control mode of outputting the sound, to a first output control mode or a second output control mode depending on a predetermined determination condition. The first output control mode includes outputting the sound continuously during travel of the vehicle, while changing the sound with magnitude of the behavior of the vehicle. The second output control mode includes outputting, each time the vehicle travels through a predetermined segment of a planned travel route of the vehicle, a reward sound corresponding to stability of the behavior of the vehicle in the predetermined segment traveled. The processing includes carrying out processing of outputting the sound in the first output control mode or the second output control mode set.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 is a table summarizing an example of condition setting in a first output control mode by the driver assistance apparatus according to the embodiment.

FIG. 7 is a diagram illustrating the sound conversion processing by the driver assistance apparatus according to the embodiment.

FIG. 8 is a table summarizing a setting example of a reward sound in a second output control mode by the driver assistance apparatus according to the embodiment.

DETAILED DESCRIPTION

Figure 1:
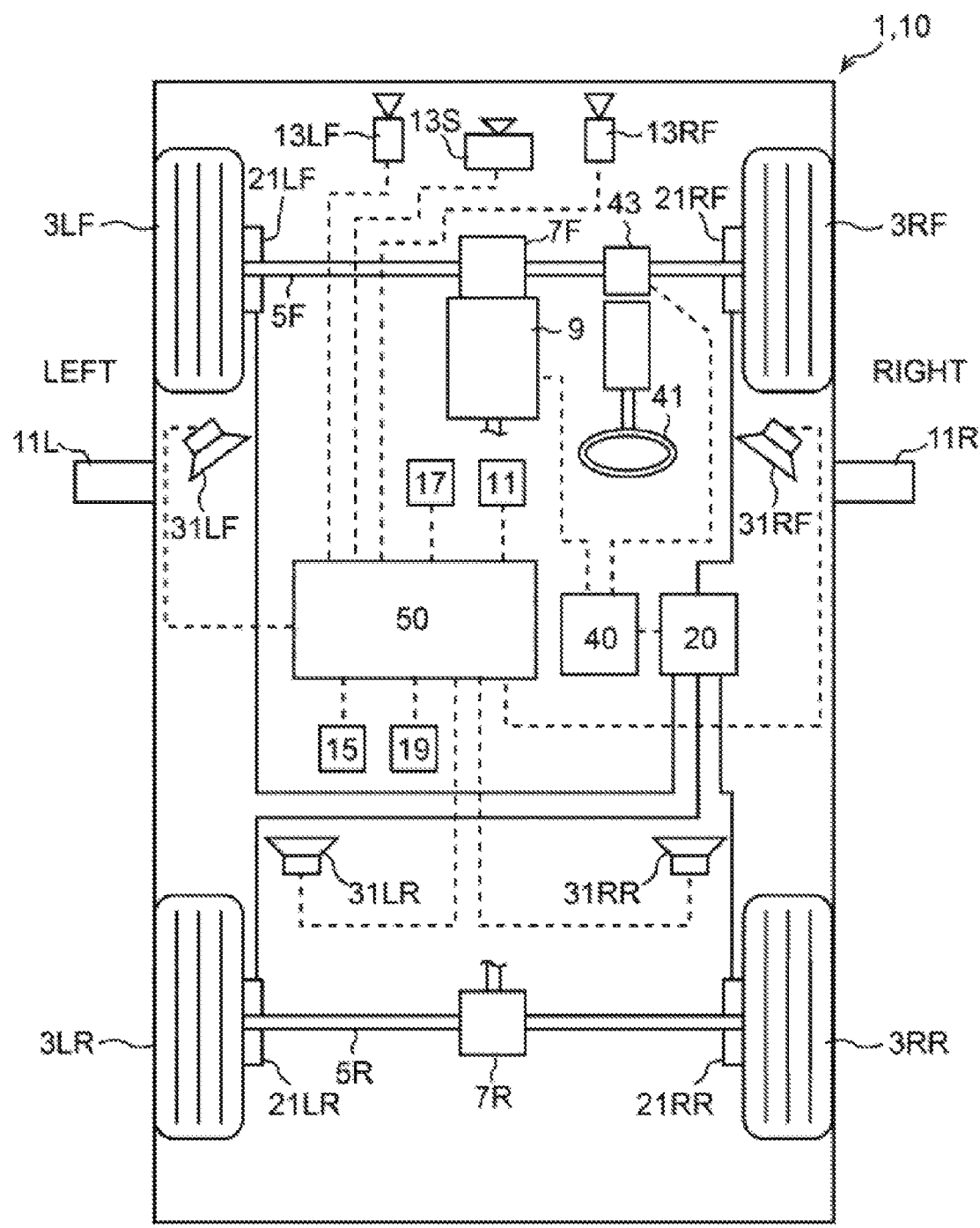
FIG. 1 is a schematic diagram illustrating a configuration example of a vehicle including a driver assistance apparatus according to one embodiment of the disclosure.

The driver assistance apparatus described in JP-A No. 2012-198344 is intended to evaluate a series of driving operations during the current drive. This causes the driver difficulties in understanding which driving operation at which timing has been evaluated. Such difficulties may be possibly counteracted by providing the driver with an evaluation result or advice about the driving operation by sound text or image display. However, this may cause possibility of lowered attention to the surroundings of the vehicle when the driver checks the evaluation result or the contents of the advice. Moreover, in informing the driver of the evaluation result of the driving operation, sometimes informing the driver of a good evaluation result may be effective, and sometimes informing the driver of a bad evaluation result may be effective.

It is desirable to provide a driver assistance apparatus and a computer-readable recording medium that make it possible to set, appropriately depending on situations, a control mode of outputting a sound corresponding to magnitude of vehicle behavior, in consideration of differences in changes in a driver's driving behavior in response to an output sound.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Configuration Example of Vehicle

Description is given first of an example of an overall configuration of a vehicle to which a driver assistance apparatus according to one embodiment of the disclosure is applicable.

FIG. 1 is a schematic diagram illustrating a configuration example of a vehicle 10 including a driver assistance apparatus 1 according to this embodiment. The vehicle 10 illustrated in FIG. 1 is constituted as a four-wheel drive vehicle that transmits driving torque to a left front wheel 3LF, a right front wheel 3RF, a left rear wheel 3LR, and a right rear wheel 3RR (in the following, collectively referred to as "wheels 3" unless distinction is particularly necessary). The driving torque is outputted from a driving force source 9 that generates the driving torque for the vehicle. The driving force source 9 may be an internal combustion engine such as a gasoline engine or a diesel engine, or may be a driving motor. The driving force source 9 may include an internal combustion engine and a driving motor together.

It is to be noted that the vehicle 10 may be an electric vehicle including two driving motors, e.g., a front wheel driving motor and a rear wheel driving motor, or may be an electric vehicle including driving motors that correspond to the respective wheels 3. In a case where the vehicle 10 is an electric vehicle or a hybrid electric vehicle, a secondary battery, and a generator such as a motor and a fuel cell are mounted on the vehicle 10. The secondary battery accumulates electric power to be supplied to the driving motor. The generator generates electric power to be charged in the battery.

The vehicle 10 includes the driving force source 9, an electric steering device 43, and a brake hydraulic control unit 20, as devices to be used in a driving control of the vehicle 10. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a vehicle control device 40 including one or more electronic control units (ECU: Electronic Control Unit).

The electric steering device 43 is provided on the front wheel driving shaft 5F. The electric steering device 43 includes an unillustrated electric motor and an unillustrated gear mechanism. The electric steering device 43 is controlled by the vehicle control device 40 to adjust steering angles of the left front wheel 3LF and the right front wheel 3RF. In manual driving, the vehicle control device 40 controls the electric steering device 43 on the basis of a steering angle of a steering wheel 41 by a driver who drives the vehicle 10. It is to be noted that the electric steering device 43 may be replaced with a hydraulic power steering device.

A brake system of the vehicle 10 is constituted as a hydraulic brake system. The brake hydraulic control unit 20 adjusts hydraulic pressure to be supplied to each of brake calipers 21LF, 21RF, 21LR, and 21RR (hereinafter, collectively referred to as "brake calipers 21" unless distinction is particularly necessary) provided respectively on the left front, right front, left rear, and right rear drive wheels 3LF, 3RF, 3LR, and 3RR, to generate a braking force. Driving of the brake hydraulic control unit 20 is controlled by the vehicle control device 40. In the case where the vehicle 10 is an electric vehicle or a hybrid electric vehicle, the brake hydraulic control unit 20 is used in conjunction with a regenerative brake by the driving motor.

The vehicle control device 40 includes one or more electronic control devices that control driving of the driving force source 9, the electric steering device 43, and the brake hydraulic control unit 20. The driving force source 9 outputs the driving torque for the vehicle 10. The electric steering device 43 controls the steering angle of the steering wheel 41 or a steering wheel. The brake hydraulic control unit 20 controls the braking force of the vehicle 10. The vehicle control device 40 may control the driving of the transmission that performs shifting of an output outputted from the driving force source 9 and transmits the resultant output to the wheels 3. In the manual driving of the vehicle 10, the vehicle control device 40 acquires data regarding an amount of an operation by the driving by the driver, and controls the driving of the driving force source 9, the electric steering device 43, and the brake hydraulic control unit 20. The driving force source 9 outputs the driving torque for the vehicle 10. The electric steering device 43 controls the steering angle of the steering wheel 41 or the steering wheel. The brake hydraulic control unit 20 controls the braking force of the vehicle 10.

The driver assistance apparatus 1 mounted on the vehicle 10 may include, for example, a vehicle body behavior measurement device 11, a vehicle surrounding situation detection device 13, a weather data detection device 15, a vehicle positional data detection device 17, an input unit 19, a sound output device 31, and a data processing device 50. The driver assistance apparatus 1 acquires data indicating behavior of the vehicle 10 and carries out processing of outputting a sound corresponding to the behavior, during travel of the vehicle 10. This makes it possible to give the driver a real-time, intuitive recognition of evaluation of their driving operation state through auditory stimulation, because the behavior of the vehicle 10 reflects, for example, the driver's steering operation state, the driver's accelerator operation state, and the driver's brake operation state. In the following, description is given in detail of the driver assistance apparatus 1 of this embodiment.

2. Configuration of Driver Assistance Apparatus

Figure 2:
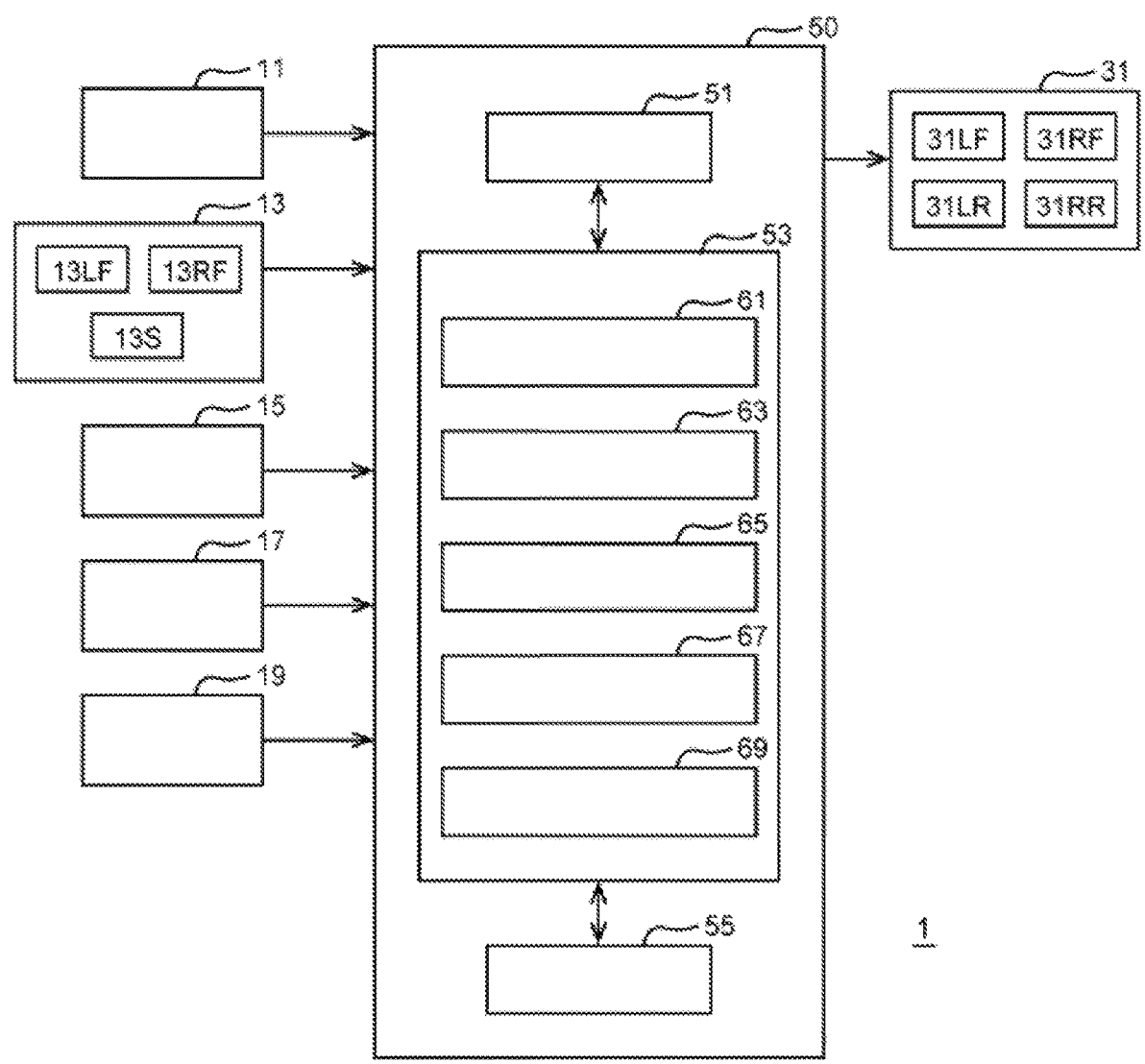
FIG. 2 is a block diagram illustrating a configuration example of the driver assistance apparatus according to one embodiment of the disclosure.

FIG. 2 is a block diagram illustrating an example of a configuration of the driver assistance apparatus 1 of this embodiment.

The driver assistance apparatus 1 may include, for example, the vehicle body behavior measurement device 11, the vehicle surrounding situation detection device 13, the weather data detection device 15, the vehicle positional data detection device 17, the input unit 19, the sound output device 31, and the data processing device 50. The vehicle body behavior measurement device 11, the vehicle surrounding situation detection device 13, the weather data detection device 15, the vehicle positional data detection device 17, the input unit 19, and the sound output device 31 are communicably coupled to the data processing device 50 through a dedicated line or a communication bus such as CAN (Controller Area Network). The data processing device 50 may include, for example, a processor such as a CPU (Central Processing Unit) or an electric circuit, and a storage element such as a RAM (Random Access Memory) and a ROM (Read Only Memory). A portion or all of the data processing device 50 may include an updatable one such as firmware, or may be, for example, a program module to be executed in accordance with a command from, for example, a CPU.

The driver assistance apparatus 1 may serve as an apparatus that outputs the sound corresponding to the behavior of the vehicle 10 and thereby give the driver the recognition of the evaluation of their driving operation through the auditory stimulation, by allowing one or more processors such as a CPU to execute a computer program. The computer program is a computer program that causes the processors to perform operation described later to be performed by the data processing device 50. The computer program to be executed by the processors may be contained in a recording medium serving as a storage 55 (memory) provided in the data processing device 50. Alternatively, the computer program to be executed by the processors may be contained in a recording medium built in the data processing device 50, or any recording medium externally attachable to the data processing device 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magnetic-optical medium such as a floptical disk; a storage element such as a RAM and a ROM; and a flash memory such as a USB (Universal Serial Bus) memory and an SSD (Solid State Drive); or any other medium that is able to hold programs.

(2-1. Vehicle Body Behavior Measurement Device)

The vehicle body behavior measurement device 11 is a device that measures the data indicating the behavior of the vehicle 10. The vehicle body behavior measurement device 11 may include, for example, one or more of a vehicle speed sensor, an acceleration rate sensor, and an angular velocity sensor. The vehicle speed sensor detects, for example, a rotational speed of a drive shaft of the vehicle 10. The acceleration rate sensor detects, at least, a longitudinal acceleration rate and a lateral acceleration rate. The longitudinal acceleration rate is an acceleration rate in a longitudinal direction of the vehicle body. The lateral acceleration rate is an acceleration rate in a vehicle widthwise direction. The acceleration rate sensor may further detect a vertical acceleration rate, i.e., an acceleration rate in a heightwise direction of the vehicle body. The angular velocity sensor detects a velocity of change in each of a roll angle, a pitch angle, and a yaw angle. The roll angle is an axial rotation angle in the longitudinal direction of the vehicle body. The pitch angle is an axial rotation angle in the vehicle widthwise direction. The yaw angle is an axial rotation angle in the heightwise direction of the vehicle body. The angular velocity sensor may be a yaw rate sensor that detects a velocity of change in the yaw angle.

The data to be measured by the vehicle body behavior measurement device 11 is data that is variable with a steering operation, an accelerator operation, and a brake operation by the driver. The data to be measured by the vehicle body behavior measurement device 11 is inputted to the data processing device 50 as the data indicating the behavior of the vehicle 10. The data processing device 50 is configured to acquire data indicating data measured by the vehicle body behavior measurement device 11. The vehicle body behavior measurement device 11 may include a sensor configured to measure data reflecting the behavior of the vehicle 10 in addition to the vehicle speed sensor, the acceleration rate sensor, and the angular velocity sensor.

(2-2. Vehicle Surrounding Situation Detection Device)

The vehicle surrounding situation detection device 13 is a device that detects vehicle surrounding situation data, i.e., data regarding a situation of surroundings of the vehicle 10. The vehicle surrounding situation detection device 13 may include, for example, one or more of a stereo camera, a monocular camera, LiDAR (Light Detection and Ranging, or Laser Imaging Detection and Ranging), and a radar sensor. In the example of the vehicle 10 illustrated in FIG. 1, the vehicle surrounding situation detection device 13 may include left and right forward view capturing cameras 13LF and 13RF in a pair, and LiDAR 13S.

The vehicle surrounding situation detection device 13 detects objects around the vehicle 10 such as other vehicles, bicycles, pedestrians, road signs, and other obstacles on the basis of the acquired data, and calculates distances to these objects, relative speeds, and relative positions. The vehicle surrounding situation detection device 13 detects the vehicle surrounding situation data regarding the vehicle 10, e.g., a road width, on the basis of the acquired data. The data to be detected by the vehicle surrounding situation detection device 13 is inputted to the data processing device 50. The data processing device 50 is configured to acquire the data detected by the vehicle surrounding situation detection device 13. The vehicle surrounding situation detection device 13 may include a device configured to detect the vehicle surrounding situation data regarding the vehicle 10, in addition to the stereo camera, the monocular camera, the LiDAR, and the radar sensor.

(2-3. Weather Data Detection Device)

The weather data detection device 15 is a device that detects weather data, i.e., data regarding the weather in a travel area of the vehicle 10. The weather data detection device 15 may include, for example, one or more of a stereo camera, a monocular camera, a rain sensor, an anemometer, and an acceleration rate sensor. The weather data detection device 15 is able to detect rainfall, snowfall, snowpack, and a frozen road surface on the basis of imaging data of the stereo camera or the monocular camera. The weather data detection device 15 is able to estimate an amount of rainfall on the basis of detection data of the rain sensor. The weather data detection device 15 is able to detect a wind speed and a wind direction on the basis of detection data of the anemometer. The weather data detection device 15 is able to estimate the wind speed and the wind direction on the basis of a sensor signal of the acceleration rate sensor.

The data to be detected by the weather data detection device 15 is inputted to the data processing device 50. The data processing device 50 is configured to acquire data detected by the weather data detection device 15. The weather data detection device 15 may include a device configured to detect the weather data in the travel area of the vehicle 10, in addition to the stereo camera, the monocular camera, the rain sensor, the anemometer, and the acceleration rate sensor. The weather data detection device 15 may receive data from an external system such as telematics, and acquire the weather data in the travel area.

(2-4. Vehicle Positional Data Detection Device)

The vehicle positional data detection device 17 receives a positioning signal and measures a position of the vehicle 10. The positioning signal is transmitted from the GNSS (Global Navigation Satellite System) typified by the GPS (Global Positioning System). The vehicle positional data detection device 17 may receive a positioning signal transmitted from another system such as a quasi-zenith satellite system instead of the GNSS or in conjunction with the GNSS, and measure the position of the vehicle 10. Data regarding the position of the vehicle 10 to be detected by the vehicle positional data detection device 17 is inputted to the data processing device 50. The data processing device 50 is configured to acquire the positional data detected by the vehicle positional data detection device 17.

(2-5. Input Unit)

The input unit 19 accepts an operation input from a user and transmits the operation input to the data processing device 50. The input unit 19 may include, for example, a touchscreen display or a dial operation device. Alternatively, the input unit 19 may include a voice recognition device that accepts an input by a voice of an occupant, or an image recognition device that accepts an input by a gesture.

In this embodiment, the input unit 19 accepts an input of driver attribute data, i.e., data regarding an attribute of the driver. The driver attribute data is data regarding the driver's driving skill, and includes, for example, one or more of the following pieces of data: the age of the driver, the number of years since licensing, how often the driver drives, and the number of years elapsed after a previous drive. The driver attribute data may further include other pieces of data that makes it possible to estimate the driver's driving skill. These pieces of data may be inputted in the form of a questionnaire in which, for example, the driver answers questions presented by the data processing device 50, or in the form of data obtained in advance by determining or accumulating these pieces of data.

The input unit 19 may accept an input of data regarding a sound preferred as an output sound. For example, the input unit 19 may be configured to accept selection by, for example, the driver of the preferred sound from among tones or kinds of sounds presented by the data processing device 50. In one example, the input unit 19 may be configured to accept selection of a musical instrument sound or a sound effect to be outputted. Data regarding the sound to be selected is held in the storage 55 of the data processing device 50 in advance, but the data regarding the sound may be updated or added by communication with, for example, an external server.

(2-6. Sound Output Device)

The sound output device 31 is a device that outputs a sound recognizable by the driver. The sound output device 31 may include a speaker provided in the vehicle 10 or may include a speaker dedicated to the driver assistance apparatus 1. The sound output device 31 is under an output control by the data processing device 50, to give the driver the recognition of the evaluation of their driving operation state through the auditory stimulation. In the vehicle 10 illustrated in FIG. 1, the sound output device 31 includes four speakers 31LF, 31RF, 31LR, and 31RR respectively provided on left front, right front, left rear, and right rear of the vehicle 10.

(2-7. Data Processing Device)

The data processing device 50 includes a communication unit 51, a processor 53, and the storage 55. The processor 53 includes an acquisition unit 61, a data processing unit 63, a first output processing unit 65, a second output processing unit 67, and a control mode setting unit 69. The processor 53 includes a processor such as a CPU. The acquisition unit 61, the data processing unit 63, the first output processing unit 65, the second output processing unit 67, and the control mode setting unit 69 are each realized by the processor executing a program. However, some of the acquisition unit 61, the data processing unit 63, the first output processing unit 65, the second output processing unit 67, and the control mode setting unit 69 may include an analog circuit.

(2-7-1. Storage)

The storage 55 includes one or more storage elements such as a RAM or a ROM. The storage 55 holds, for example, a program to be executed by the processor 53, various parameters to be used in the execution of the program, acquired data, and data regarding operation results.

(2-7-2. Communication Unit)

The communication unit 51 is an interface for transmission and reception of data and signals to and from the vehicle body behavior measurement device 11, the vehicle surrounding situation detection device 13, the weather data detection device 15, the vehicle positional data detection device 17, the input unit 19, and the sound output device 31.

(2-7-3. Acquisition Unit)

The acquisition unit 61 of the processor 53 acquires data to be outputted from the vehicle body behavior measurement device 11, the vehicle surrounding situation detection device 13, the weather data detection device 15, the vehicle positional data detection device 17, and the input unit 19 through the communication unit 51. The data to be acquired by the acquisition unit 61 includes the data indicating the behavior of the vehicle 10 to be outputted from the vehicle body behavior measurement device 11. The acquisition unit 61 acquires the data on predetermined calculation cycles, and stores the acquired data in the storage 55.

(2-7-4. Data Processing Unit)

The data processing unit 63 of the processor 53 performs predetermined data processing on the data indicating the behavior of the vehicle 10 acquired by the acquisition unit 61. In one example, the data processing unit 63 carries out one or more of a smoothing process, an absolute value conversion process, and a differentiation process on the acquired measurement data regarding the vehicle speed, the acceleration rate, or the angular velocity, and calculates an index value. The index value is a value indicating magnitude of the behavior of the vehicle 10. The acceleration rate includes the longitudinal acceleration rate, the lateral acceleration rate, and the vertical acceleration rate. The angular velocity includes the angular velocities of the yaw angle, the roll angle, and the pitch angle.

For example, the data processing unit 63 performs the smoothing process, the absolute value conversion process, and the differentiation process on the measurement data regarding the vehicle speed, the acceleration rate, or the angular velocity, and calculates an absolute value of the acceleration rate, a jerk of the absolute value of the acceleration rate, or a jerk of an absolute value of the angular velocity, i.e., an angular acceleration rate. The data processing unit 63 may assume the calculated absolute values of the acceleration rate, the angular velocity, the jerk, or the angular acceleration rate to be the index value. In particular, assuming the absolute value of the jerk or the angular acceleration rate to be the index value allows for alleviation of an influence of a change in the vehicle speed, the acceleration rate, or the angular velocity caused by an influence of a track of a travel route or acceleration and deceleration of other vehicles. This leads to more accurate evaluation of a change in the behavior of the vehicle 10 caused by the driver's driving operation state.

The data processing unit 63 may calculate the single index value, using multiple pieces of data among the absolute values of the acceleration rate, the angular velocity, the jerk, and the angular acceleration rate. In this case, the data processing unit 63 may replace a value of each piece of the data to be used, with the same index, e.g., a value of 0 to 100 both inclusive. The data processing unit 63 may set, as the index value, an average value of values obtained by replacing the values of all pieces of the data to be used, with the same index. In this embodiment, the data processing unit 63 calculates the index value, using the number of pieces, or the kinds, of data set on the basis of a driving condition of the vehicle by the first output processing unit 65 or the second output processing unit 67 described later.

The acceleration rate and the jerk to be calculated are calculated individually for one or more of the longitudinal acceleration rate, the lateral acceleration rate, and the vertical acceleration rate. The angular velocity and the angular acceleration rate to be calculated are calculated individually for one or more of the yaw angle, the roll angle, and the pitch angle. The index value to be calculated by the data processing unit 63 takes a larger value as the magnitude of the behavior of the vehicle 10 becomes larger, and takes a smaller value as the magnitude of the behavior becomes smaller.

(2-7-5. First Output Processing Unit)

With the control mode set to the first output control mode, the first output processing unit 65 of the processor 53 carries out the processing of outputting the sound continuously during the travel of the vehicle 10, while changing the output sound with the magnitude of the behavior of the vehicle 10. In this embodiment, the first output processing unit 65 converts the index value calculated by the data processing unit 63 into output sound data, and controls driving of the sound output device 31 on the basis of the output sound data to generate the output sound. A range in which the output sound is continuously changed with a change in the index value (hereinafter, also referred to as an "output sound change range") may be fixed, or may be variable. In this embodiment, an upper limit value that defines the output sound change range is set on the basis of the driving condition of the vehicle 10. A lower limit value of the output sound change range may be zero, or may be a positive value exceeding zero.

For example, the first output processing unit 65 sets the upper limit value on the basis of the driver attribute data and traveling environment as the driving condition of the vehicle 10. The driver attribute data is inputted from the input unit 19. The traveling environment influences behavior stability of the vehicle 10. In one example, the first output processing unit 65 sets the upper limit value to a smaller value as the estimated driving skill is higher, and sets the upper limit value to a larger value as the estimated driving skill is lower, on the basis of the data regarding the driver's driving skill acquired as the driver attribute data. Thus, for example, in a case where a driver has high driving skill and the behavior of the vehicle 10 is stable, the upper limit value is lowered. This makes it possible to give the driver a recognition of a more subtle change in the behavior of the vehicle 10 than a case of a driver having low driving skill. Hence, it is possible to lead the driver with the high driving skill to further stabilization of the behavior of the vehicle 10. It is possible to lead the driver with the low driving skill to an appropriate level of the behavior stability, depending on the driver's driving skill.

The driver attribute data regarding the driver's driving skill may include, for example, one or more of the following pieces of data acquired through the input unit 19: the age of the driver; the number of years since licensing; how often the driver drives; and the number of years elapsed after the previous drive. For example, in a case where a driver is aged, the upper limit value is raised because there is high possibility that the driving skill is lowered. As the number of years since licensing becomes larger, the upper limit value is lowered because the estimated driving skill is high. As the driver drives more often, the upper limit value is lowered because the estimated driving skill is high. As the number of years elapsed after the previous drive becomes larger, that is, as a blank period becomes longer, the upper limit value is raised because there is high possibility that the driving skill is lowered.

The first output processing unit 65 may adjust the upper limit value on the basis of data regarding the index value during previous drives of the same driver, together with the data acquired through the input unit 19. For example, the first output processing unit 65 may use data regarding the number of times the index value calculated by the data processing unit 63 exceeds the upper limit value, or data regarding how often the index value calculated by the data processing unit 63 exceeds the upper limit value, during the previous drives of the same driver. In this case, as the number of times the index value exceeds the upper limit value is smaller, or as the index value exceeds the upper limit less often, the upper limit value is lowered because the estimated driving skill is high.

The first output processing unit 65 may set the upper limit value on the basis of the traveling environment that influences the behavior stability of the vehicle. For example, the first output processing unit 65 sets the upper limit value to a small value in traveling environment in which enhanced behavior stability of the vehicle is desirable because of a high risk to be caused by traffic environment. The first output processing unit 65 sets the upper limit value to a large value in traveling environment with a low risk to be caused by the traffic environment. Hence, it is possible to bring the driver's driving operation into a driving operation state that possibly stabilizes the behavior of the vehicle 10, during a drive in the traveling environment with the high risk to be caused by the traffic environment. This leads to safe driving of the vehicle.

Non-limiting examples of the traveling environment having the high risk to be caused by the traffic environment may include a travel scene with a high risk of, for example, an unexpected event to be caused by the traffic environment. Such a travel scene may be exemplified by a travel scene with many pedestrians or bicycles, a travel scene with heavy traffic of vehicles, a travel scene along a school route during commuting hours, and a travel scene along a narrow road. For example, the first output processing unit 65 may determine the traveling environment with the high risk to be caused by the traffic environment, on the basis of the vehicle surrounding situation data inputted from the vehicle surrounding situation detection device 13, the positional data regarding the vehicle detected by the vehicle positional data detection device 17, and map data.

In one example, the first output processing unit 65 may identify the travel scene with many pedestrians or bicycles, or the travel scene with heavy traffic of vehicles, on the basis of the number of pedestrians, bicycles, and other vehicles recognized from the vehicle surrounding situation data inputted from the vehicle surrounding situation detection device 13. The first output processing unit 65 may identify the travel scene along a school route on commuting hours, on the basis of data regarding a road sign recognized from the vehicle surrounding situation data inputted from the vehicle surrounding situation detection device 13, the positional data regarding the vehicle detected by the vehicle positional data detection device 17, the map data, and time data. The first output processing unit 65 may identify the travel scene along a narrow road, on the basis of a road width recognized from the vehicle surrounding situation data inputted from the vehicle surrounding situation detection device 13.

As to the traveling environment that influences the behavior stability of the vehicle, the first output processing unit 65 may set the upper limit value to a small value in traveling environment with high possibility that the behavior stability of the vehicle lowers, and may set the upper limit value to a large value in traveling environment with low possibility that the behavior stability of the vehicle lowers. Hence, it is possible to bring the driver's driving operation into the driving operation state that possibly stabilizes the behavior of the vehicle 10, during a drive in the traveling environment with possibility that the behavior stability of the vehicle lowers. Non-limiting examples of the traveling environment with the high possibility that the behavior stability of the vehicle lowers may include a travel scene that involves a high risk of, for example, an unexpected event to be caused by weather environment, e.g., heavy rainfall, heavy snowfall, storm, snowpack, and a frozen road surface. The first output processing unit 65 may estimate the traveling environment with the high possibility that the behavior stability of the vehicle lowers because of a weather condition, on the basis of the weather data in the travel area of the vehicle detected by the weather data detection device 15.

The first output processing unit 65 assigns the index value to an element of the output sound to be changed continuously with the change in the index value, on the basis of the output sound change range determined by the upper limit value set. The first output processing unit 65 sets the output sound corresponding to the index value. Hereinafter, the element of the output sound to be changed continuously with the change in the index value is also referred to as a "change element". The change element of the output sound may include, for example, one or more of a pitch, a frequency, a volume, a tempo, and the number of tones to be generated, but is not limited to these examples. The tempo is a time interval at which the sound is outputted.

The state in which the output sound changes continuously with the change in the index value refers to a state in which the change element of the output sound is assigned stepwise or steplessly to the index value in accordance with magnitude of the value, and the sound corresponding to the calculated index value is outputted. Non-limiting examples of the change element may include the pitch, the frequency, the volume, the tempo, or the number of the tones to be generated. The state in which the output sound is continuously outputted refers to a state in which the sound is continuously outputted regardless of whether the sound is continuously changed or whether the sound is constant.

In this embodiment, in a case where the index value is within the output sound change range, the sound to be outputted continuously from the sound output device 31 changes continuously with the change in the index value. For example, in a case where the kind of the output sound is a musical instrument sound having a musical scale, the pitch of the output sound is set to become higher stepwise and continuously, as the index value becomes larger. In a case where the kind of the output sound is not a musical instrument sound, or in a case where the kind of the output sound is a musical instrument sound without a musical scale, the frequency of the output sound may be set to become higher steplessly or continuously, as the index value becomes larger. Alternatively, the volume of the output sound may be set to become larger continuously, as the index value becomes larger. The tempo of the output sound may be set to become faster continuously, as the index value becomes larger. The number of the tones to be generated as the output sound may be set to become smaller stepwise and continuously, as the index value becomes larger. Thus, it is possible to give the driver an intuitive recognition of a change in the behavior stability of the vehicle 10. In particular, it is possible to give the driver a more intuitive recognition that the behavior stability of the vehicle 10 is lowering, in a case where the pitch or the frequency of the output sound is set to become higher as the index value becomes larger, in a case where the volume is set to become larger as the index value becomes larger, in a case where the tempo is set to become faster as the index value becomes larger, or in a case where the number of the tones to be generated is set to become smaller as the index value becomes larger.

In a case where the index value is equal to or larger than the upper limit value, a predetermined control set in advance is carried out. In this embodiment, in the case where the index value is equal to or larger than the upper limit value, the sound to be outputted continuously from the sound output device 31 is made a constant sound. For example, in a case where the pitch or the frequency of the output sound becomes higher in the output sound change range as the index value becomes larger, when the index value is equal to or larger than the upper limit value, the pitch or the frequency of the output sound may be fixed to the highest pitch or the highest frequency in a range where the pitch or the frequency changes continuously. Similarly, in a case where the volume of the output sound becomes larger in the output sound change range as the index value becomes larger, when the index value is equal to or larger than the upper limit value, the volume of the output sound may be fixed to the largest volume in a range where the volume changes continuously. In a case where the tempo of the output sound becomes faster in the output sound change range as the index value becomes larger, when the index value is equal to or larger than the upper limit value, the tempo of the output sound may be fixed to the fastest tempo in a range where the tempo changes continuously. In a case where the number of the tones of the output sound becomes smaller in the output sound change range as the index value becomes larger, when the index value is equal to or larger than the upper limit value, the number of the tones of the output sound may be fixed to the smallest value in a range where the number of the tones continuously changes. This makes it possible to give the driver an intuitive recognition that the behavior stability of the vehicle 10 has lowered.

In this embodiment, in a case where the lower limit value of the output sound change range is set to a value exceeding zero, when the index value is equal to or smaller than the lower limit value, the sound to be outputted continuously from the sound output device 31 is made a constant sound. For example, in a case where the pitch or the frequency of the output sound becomes larger in the output sound change range as the index value becomes larger, when the index value is equal to or smaller than the lower limit value, the pitch or the frequency of the output sound may be fixed to the lowest pitch or the lowest frequency in the range where the pitch or the frequency changes continuously. Similarly, in a case where the volume of the output sound becomes larger in the output sound change range as the index value becomes larger, when the index value is equal to or smaller than the lower limit value, the volume of the output sound may be fixed to the smallest volume in the range where the volume changes continuously. In a case where the tempo of the output sound becomes faster in the output sound change range as the index value becomes larger, when the index value is equal to or smaller than the lower limit value, the tempo of the output sound may be fixed to the slowest tempo in the range where the tempo changes continuously. In a case where the number of the tones of the output sound becomes larger in the output sound change range as the index value becomes larger, when the index value is equal to or smaller than the lower limit value, the number of the tones of the output sound may be fixed to the smallest value in the range where the number of the tones changes continuously. This makes it possible to give the driver an intuitive recognition that the behavior stability of the vehicle 10 is high.

The output sound may include the single tone or the single kind of sound. However, the output sound may include a chord in which sounds of different pitches, or sounds of different tones or kinds are generated simultaneously. For example, the number of the tones or the kinds of the output sounds may be increased or decreased in accordance with an increase or decrease in the number of the kinds of the data to be used in evaluating the magnitude of the behavior of the vehicle 10. In a case where the magnitude of the behavior of the vehicle 10 is evaluated using multiple pieces of data, the index value may be calculated for each piece of data, and the sounds corresponding to the respective index values may be outputted. In this case, the sounds corresponding to the respective index values may be a sound of the same tone or the same kind, or may be sounds of different tones or different kinds. In a case where the output sound is a chord, it is possible to allow the driver to hear the sound as a pleasant sound depending on the pitch to be used, or the tone or the number of the notes. It is also possible to allow the driver to hear the sound as a sound giving a negative impression.

The first output processing unit 65 sets the output sound change range in accordance with the upper limit value set, and assigns the change element of the output sound for each index value. For example, in the case where the musical instrument sound having the musical scale is selected as the tone of the output sound, the first output processing unit 65 assigns the index value to each note of the musical scale of the musical instrument sound to be used. In one example, in a case where the piano sound is used as the output sound, in a region where the index value is equal to or smaller than the lower limit value of the output sound change range, the first output processing unit 65 sets the pitch of the output sound to the lowest note of the musical scale. In a region in which the index value is equal to or larger than the upper limit value of the output sound change range, the first output processing unit 65 sets the pitch of the output sound to the highest note of the musical scale. In a case where the index value is within the output sound change range, the first output processing unit 65 assigns the index value to each note of the musical scale corresponding to each key between the lowest note and the highest note of the musical scale.

In a case where a sound effect having no musical scale is selected as the kind of the output sound, the first output processing unit 65 sets a frequency band as the change element of the output sound within a frequency range of the human audible band, e.g., 20 Hz to 20,000 Hz, and assigns the index value to the frequency. In such a case as well, similarly, in the region where the index value is equal to or smaller than the lower limit value of the output sound change range, the first output processing unit 65 sets the frequency of the output sound to a minimum value of the frequency band. In the region where the index value is equal to or larger than the upper limit value of the output sound change range, the first output processing unit 65 sets the frequency of the output sound to a maximum value of the frequency band. In the case where the index value is within the output sound change range, the first output processing unit 65 assigns the index values steplessly between the minimum value and the maximum value of the frequency band.

In the case where the volume, the tempo, or the number of the tones of the output sound is changed, instead of changing the pitch or the frequency of the output sound, or in addition to changing the pitch or the frequency of the output sound, the first output processing unit 65 also assigns the index value to the change element stepwise or steplessly.

In one example, a range where the continuously changing change element changes in the output sound change range may be the same regardless of the upper limit value. That is, a range where the pitch, the frequency, the volume, the tempo or the number of the tones changes may be the same regardless of the upper limit value. In other words, in one example, a range where the change element of the output sound changes may be the same regardless of a size of the output sound change range. This makes it possible to give the driver an intuitive recognition as to how close the magnitude of the behavior of the vehicle 10 is to the current upper limit value, regardless of the size of the output sound change range. Moreover, if the range in which the change element of the output sound changes is the same regardless of the size of the output sound change range, it is possible to change the output sound with a subtle change in the behavior of the vehicle 10 as the output sound change range becomes narrower. Hence, it is possible to give the driver a recognition of a more subtle change in the behavior.

As described, the first output processing unit 65 sets the tone or the kind of the output sound to the tone or the kind selected by the user such as the driver, and assigns the index value to the change element of the output sound in accordance with the setting of the output sound change range. Thus, the first output processing unit 65 sets the change element corresponding to the index value calculated by the data processing unit 63. This causes the index value calculated by the data processing unit 63 to be converted into the output sound data.

The first output processing unit 65 controls the driving of the sound output device 31 on the basis of the output sound data thus calculated, to generate the output sound. In this embodiment, the first output processing unit 65 allows the sound of the set tone or the set kind to be outputted in accordance with the set change element, e.g., the pitch, the frequency, the volume, the tempo, or the number of tones.

The first output processing unit 65 may set a condition of the data processing by the data processing unit 63 on the basis of one or both of the driver attribute data and data regarding the traveling environment of the vehicle 10. For example, the first output processing unit 65 may set the number of the kinds of the data to be used in calculating the index value indicating the magnitude of the behavior of the vehicle 10 in the data processing unit 63, on the basis of one or both of the driver attribute data and the data regarding the traveling environment of the vehicle.

In this case, the first output processing unit 65 increases the number of the kinds of the data to be used in calculating the index value, as the driver's driving skill estimated from the driver attribute data is higher. The first output processing unit 65 decreases the number of the kinds of the data to be used in calculating the index value, as the driver's driving skill estimated is lower. Thus, for example, in a case where a driver has high driving skill and the behavior of the vehicle 10 is stable, the driving operation state is evaluated on the basis of the larger number of the kinds of the data. This makes it possible to lead the driver to further stabilization of the behavior of the vehicle 10. For a driver having low driving skill, the driving operation state is evaluated on the basis of the relatively smaller number of pieces of the data. This leads to the appropriate level of the behavior stability, depending on the driver's driving skill.

Moreover, the first output processing unit 65 increases the number of the kinds of the data to be used in calculating the index value, in the traveling environment in which the enhanced behavior stability of the vehicle is desirable, or in traveling environment with high possibility that the behavior stability of the vehicle lowers. Accordingly, the driving operation state is evaluated on the basis of the larger number of the kinds of the data during a drive in the traveling environment with the high risk to be caused by the traffic environment and in which the enhanced behavior stability of the vehicle is desirable. Hence, it is possible to bring the driver's driving operation into the driving operation state that possibly stabilizes the behavior of the vehicle 10, leading to safe driving of the vehicle 10. Furthermore, the driving operation state is evaluated on the basis of the larger number of the kinds of the data during a drive in the traveling environment with the high possibility that the behavior stability of the vehicle 10 lowers, e.g., in heavy rainfall or snowfall, or in a storm. Hence, it is possible to bring the driver's driving operation into the driving operation state that possibly stabilizes the behavior of the vehicle 10.

In the case where the number of the kinds of the data to be used in calculating the index value is increased or decreased, priority may be given to using data regarding the lateral jerk or the angular acceleration rate of the yaw angle regardless of the number of the kinds of the data to be used. This makes it easier to evaluate the driver's steering operation state. Alternatively, priority may be given to using data regarding the longitudinal jerk or the angular acceleration rate of the roll angle. This makes it easier to evaluate the driver's accelerator operation state or the driver's brake operation state.

FIG. 3 is a table summarizing an example of a method of setting the upper limit value on the basis of the driver attribute data and the data regarding the traveling environment that influences the behavior stability of the vehicle 10, and a method of increasing or decreasing the number of the kinds of the data to be used in calculating the index value.

As summarized in FIG. 3, as for the driver attribute data, in a case where the driver is aged enough to exceed a preset age, the upper limit value of the index value is raised by a predetermined value, and the number of the kinds of the data to be used in calculating the index value is reduced. As the number of years since licensing is larger, the upper limit value of the index value is lowered by a predetermined value, and the number of the kinds of the data to be used in calculating the index value is increased. As the number of years since licensing is smaller, the upper limit value of the index value is raised by a predetermined value, and the number of the kinds of the data to be used in calculating the index value is reduced.

As the driver drives more often, the upper limit value of the index value is lowered by a predetermined value, and the number of the kinds of the data to be used in calculating the index value is increased. As the driver drives less often, the upper limit value of the index value is raised by a predetermined value, and the number of the kinds of the data to be used in calculating the index value is reduced. As the number of years elapsed after the previous ride is larger, i.e., as the blank period is longer, the upper limit value of the index value is raised by a predetermined value, and the number of the kinds of the data to be used in calculating the index value is reduced.

As for the data regarding the traveling environment of the vehicle 10, in the travel scene with many pedestrians or bicycles, the travel scene with heavy traffic, the travel scene along a school route in commuting hours, and the travel scene along a narrow road, the enhanced behavior stability of the vehicle 10 is desirable. Accordingly, the upper limit value of the index value is lowered by a predetermined value, and the number of the kinds of the data to be used in calculating the index value is increased. Moreover, in a situation with heavy rainfall or snowfall, a high wind speed, snowpack, or a frozen road surface, there is high possibility that the behavior stability of the vehicle 10 lowers. Accordingly, the upper limit value of the index value is lowered by a predetermined value, and the number of the kinds of the data to be used in calculating the index value is increased.

The first output processing unit 65 raises or lowers the upper limit value with respect to a preset reference value of the upper limit value, and increases or decreases the number of the kinds of the data, on the basis of the driver attribute data and the data regarding the traveling environment of the vehicle. For example, in a case where the index value is calculated as an index value of 0 to 100 both inclusive, the upper limit value may be calculated by assuming the reference value of the upper limit value to be 50, and adding or subtracting "10" to or from the reference value of the upper limit value, on the basis of each piece of the data. Alternatively, let us assume a case where the following 12 pieces of the data are available for the calculation of the index value: the longitudinal acceleration rate; the lateral acceleration rate; the vertical acceleration rate; the angular velocity of the yaw angle; the angular velocity of the pitch angle; the angular velocity of the roll angle; the longitudinal jerk; the lateral jerk; the vertical jerk; the angular acceleration rate of the yaw angle; the angular acceleration rate of the pitch angle; and the angular acceleration rate of the roll angle. In this case, the reference number of pieces of the data may be set to 5, and the number of pieces of the data to be used may be set by increasing or decreasing the number of pieces of the data one by one on the basis of each piece of the data. Note that the upper limit value and the number of the kinds of the data are increased or decreased within a range between a maximum value and a minimum value set in advance.

An amount of the increase or the decrease in increasing or decreasing the upper limit value, and an amount of the increase or the decrease in increasing or decreasing the number of the kinds of the data may be constant regardless of the kinds of the data, and may be weighted in accordance with the kinds of the data.

In the following, with reference to FIGS. 4 to 6, description is given of examples of data conversion processing, and sound conversion processing, and condition setting processing in the first output control mode.

Figure 4:
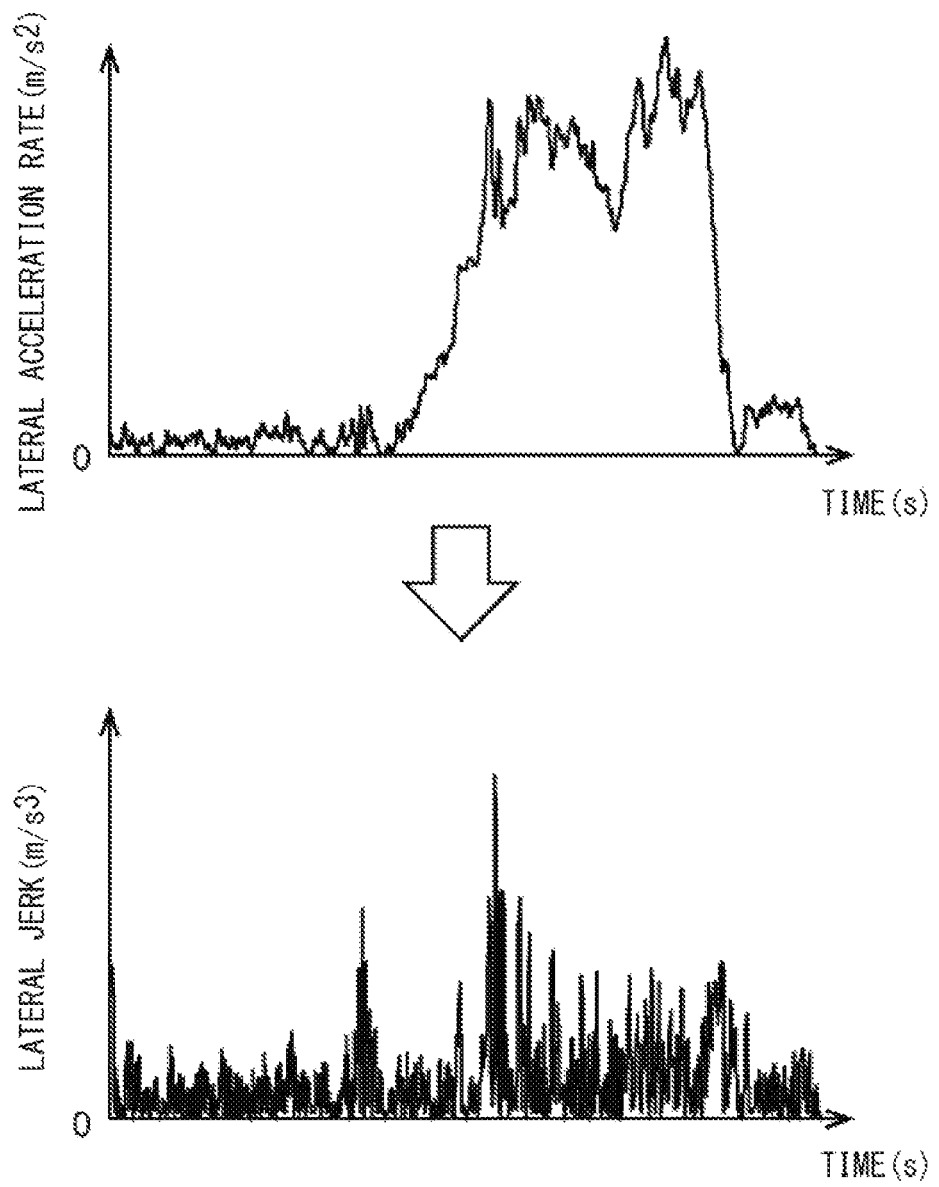
FIG. 4 is a diagram illustrating data processing by the driver assistance apparatus according to the embodiment.
Figure 5:
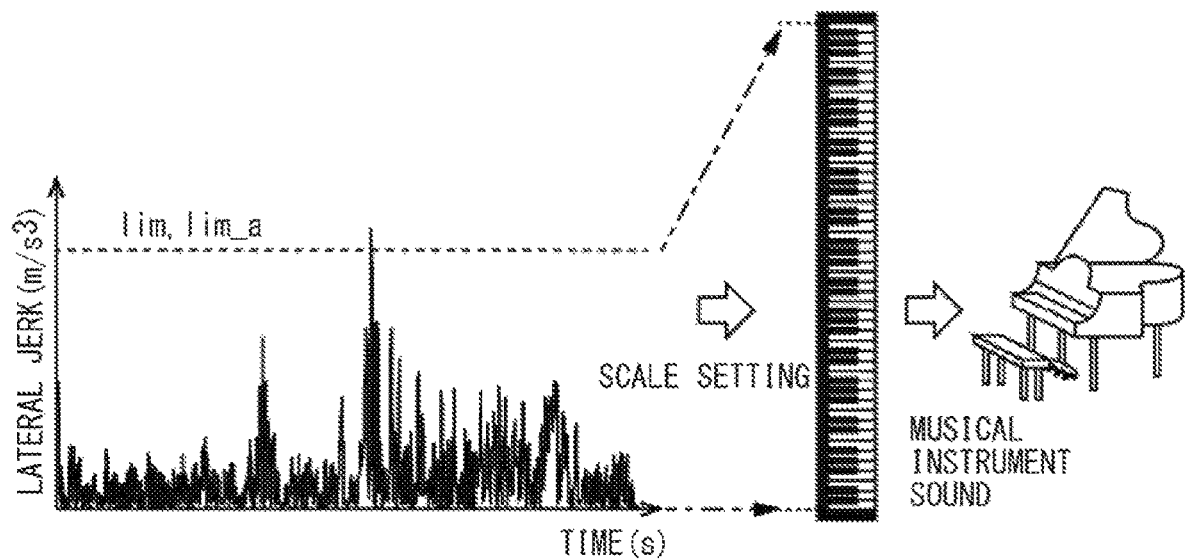
FIG. 5 is a diagram illustrating sound conversion processing by the driver assistance apparatus according to the embodiment.

FIGS. 4 and 5 are explanatory diagrams illustrating an example of the data conversion processing by the data processing unit 63 and the sound conversion processing by the first output processing unit 65. FIGS. 4 and 5 illustrate an example where the pitch of the piano sound to be outputted is set, with a value of the lateral jerk as the index value. The lateral jerk is obtained from the measurement data regarding the lateral acceleration rate detected by the acceleration rate sensor as one of the sensors of the vehicle body behavior measurement device 11. In the example illustrated in FIG. 5, the lower limit value of the output sound change range in which the output sound is continuously changed with the change in the index value is set to zero.

As illustrated in FIG. 4, the data processing unit 63 carries out the smoothing process and the absolute value conversion process on the measurement data regarding the lateral acceleration rate, to convert the measurement data regarding the lateral acceleration rate into data regarding an absolute value of the lateral acceleration rate. Furthermore, the data processing unit 63 carries out time differentiation process, to convert the measurement data regarding the lateral acceleration rate into data regarding an absolute value of the lateral jerk.

As illustrated in FIG. 5, the first output processing unit 65 sets the pitch of the output sound in accordance with the absolute value of the lateral jerk, i.e., the index value. In one example, in a case where the index value is smaller than the upper limit value lim, the first output processing unit 65 assigns the index value to each note of the musical scale, to raise the pitch as the index value becomes larger, within a preset range of the musical scale. That is, the first output processing unit 65 assumes the index value of zero to be the lowest note of the musical scale, assumes the index value of the upper limit lim to be the highest note of the musical scale, and assigns the index values between zero and the upper limit value lim to each note of the musical scale. The first output processing unit 65 assigns all the index values equal to or larger than the upper limit value lim to the highest note of the musical scale.

In addition, the first output processing unit 65 sets the tone of the output sound to the piano sound, and sets the pitch of the output sound to the note of the musical scale corresponding to the value of the lateral jerk calculated by the data processing unit 63. In this way, the piano sound having the pitch corresponding to the index value reflecting the behavior of the vehicle 10 is outputted. As a result, a change in the behavior of the vehicle 10 is outputted as a change in the sound, making it possible to give the driver the real-time recognition of the evaluation of their driving operation state, without distracting the driver's attention, during travel of the vehicle.

Figure 6:
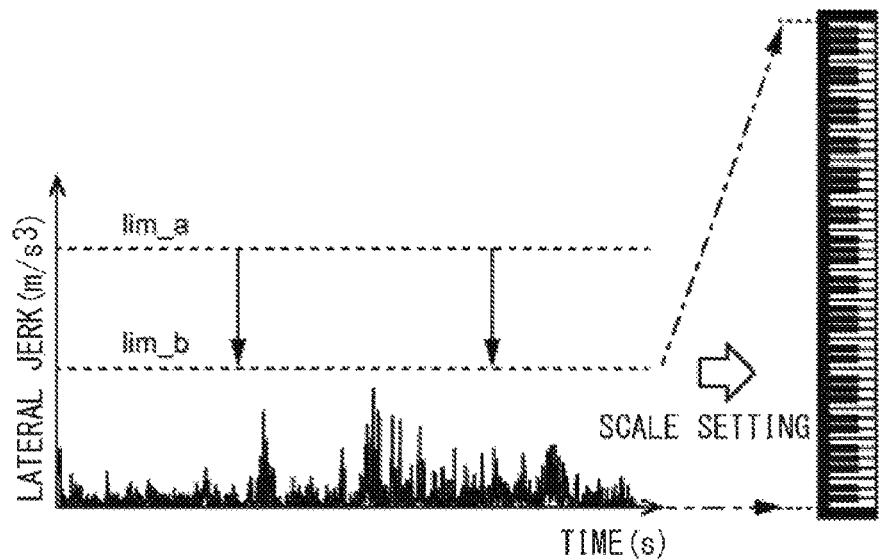
FIG. 6 is a diagram illustrating a change in an output sound by a change in a threshold in the first output control mode by the driver assistance apparatus according to the embodiment.

Description now moves on to the change in the pitch of the output sound depending on the difference in the upper limit value, with reference to FIGS. 5 and 6. FIG. 6 is an explanatory diagram illustrating an example in which the upper limit value is lowered in accordance with the driver's driving skill. It is assumed that FIG. 5 illustrates the absolute value of the lateral jerk obtained from the driving operation of a driver having low driving skill, and FIG. 6 illustrates the absolute value of the lateral jerk obtained from the driving operation of a driver having high driving skill. An upper limit value lim_a in FIG. 6 corresponds to the upper limit value lim illustrated in FIG. 5.

As illustrated in FIG. 5, as for the driving operation of the driver having the low driving skill, the absolute value of the lateral jerk, i.e., the index value, becomes relatively large, and therefore, the upper limit value lim_a is set to a relatively large value. In this case, the first output processing unit 65 assumes the index value of zero to be the lowest note of the musical scale, assumes the index value of the upper limit value lim_a to be the highest note of the musical scale, in the preset range of the musical scale, and assigns the index values between zero and the upper limit value lim_a to the respective notes of the musical scale.

As illustrated in FIG. 6, as for the driving operation of the driver having the high driving skill, the absolute value of the lateral jerk, i.e., the index value, becomes relatively small, and therefore, an upper limit value limb is set to a relatively small value. In this case as well, the first output processing unit 65 assumes the index value of zero to be the lowest note of the musical scale, assumes the index value of the upper limit value lim_b to be the highest note of the musical scale, in the preset range of the musical scale, and assigns the index values between zero and the upper limit value lim_b to the respective notes of the musical scale.

At this occasion, irrespective of the set upper limit values lim_a, and lim_b, the range of the musical scale and the number of the notes of the musical scale as the change element are made constant. This makes it possible to change the output sound with a more subtle change in the lateral jerk in the output sound change range, as the output sound change range becomes narrower. Hence, it is possible to give the driver the recognition of a more subtle change in the behavior, as the behavior stability of the vehicle 10 becomes higher. This makes it possible to lead the driver to the driving operation state that enhances the behavior stability more.

In the output sound change range, a range of the index value from the lower limit, e.g., zero, to the upper limit value lim_a or limb may be separated off at equal intervals by the number of the notes of the musical scale. The intervals between the index values assigned to the respective notes of the musical scale may be equal. Alternatively, the intervals between the index values assigned to the respective notes of the musical scale may be different from note to note. For example, the intervals between the index values assigned to the respective notes of the musical scale may be enlarged in a region where the index value is close to the lower limit value, and the intervals between the index values assigned to the respective notes of the musical scale may be reduced in a region where the index value is close to the upper limit value. This makes it possible to suppress a change in the output sound in the region where the index value is close to the lower limit value.

Alternatively, the intervals between the index values assigned to the respective notes of the musical scale in the region where the index value is close to the lower limit value may be reduced. This makes it possible to give the driver the recognition of a subtle change in the behavior of the vehicle 10 in the region where the index value is small. That is, in a case where the upper limit value lim_b is set to a small value, a change in the pitch of the output sound becomes larger even when the change in the index value is small, as compared with a case where the upper limit value lim_a is set to a large value. Moreover, in the case where the upper limit value limb is set to a small value, the pitch of the output sound is fixed at the highest note of the musical scale, at the upper limit value lim_b smaller than the upper limit value lim_a, as compared with the case where the upper limit value lim_a is set to a large value. Accordingly, as for the driver with the high driving skill, it is possible to lead the driver to the driving operation state that enhances the behavior stability of the vehicle 10 more.

Let us consider a case where the setting of the upper limit values lim_a and limb is replaced with a degree of risk in the traveling environment of the vehicle. In this case, as the degree of risk becomes higher, the upper limit value limb of the relatively smaller value may be set. This makes it possible to bring the driver's driving operation into the driving operation state that enhances the behavior stability of the vehicle 10 more. Hence, it is possible to prompt the driver to be more careful in the driving operation, making it possible to suppress unexpected events or suppress nearby participants in the traffic from having the sense of fear or risk.

In setting the output sound change range, the first output processing unit 65 may set not only the upper limit value but also the lower limit value. That is, the lower limit value of the range in which the sound is continuously changed with the change in the index value does not have to be zero. For example, the behavior of the vehicle 10 may have slight fluctuations regardless of the driver's driving skill. Accordingly, the lower limit value of the index value may be set to a value exceeding zero, and the output sound may be continuously changed in a predetermined range in which the index value is equal to or larger than the lower limit value. In this case, in a case where the index value is smaller than the lower limit value, the first output processing unit 65 may stop outputting the sound. This makes it possible to give the driver a recognition that the behavior of the vehicle 10 is unstable enough for the vehicle 10 to fluctuate more than usual.

In a case where the vehicle 10 travels along a school route during commuting hours, the first output processing unit 65 may change the tone or the kind of the output sound to the tone or the kind that gives the driver the negative impression. The sound of the tone or the kind that gives the driver the negative impression may be, for example, a preset sound of a tone or a kind that does not suit the driver's preference. Alternatively, the output sound in a normal state may be a chord including multiple notes having different pitches, while the output sound in traveling along a school route during commuting hours may be changed to the single note. This makes it possible to prompt the driver to avoid traveling along the school route.

The traveling environment in which the tone or the kind of the output sound is changed to the tone or the kind that gives the driver the negative impression is not limited to school routes. The tone or the kind of the output sound may be changed to the tone or the kind that gives the driver the negative impression, in preset traveling environment having a presumably high degree of risk to be caused by the traffic environment, e.g., a case where the vehicle travels in a crowded shopping district. The traveling environment having the presumably high degree of risk to be caused by the traffic environment may be identified on the basis of, for example, the positional data inputted from the vehicle positional data detection device 17, the map data of the navigation system, and the time data. Alternatively, the traveling environment having the presumably high degree of risk to be caused by the traffic environment may be identified on the basis of the number of pedestrians or bicycles estimated on the basis of the detection data by the vehicle surrounding situation detection device 13.

The first output processing unit 65 may stop outputting the sound in the traveling environment where the behavior stability of the vehicle 10 lowers. For example, in a scene of traveling along an unpaved road such as a gravel road or a scene of traveling while avoiding other vehicles, e.g., in congestion, the behavior stability of the vehicle 10 lowers easily regardless of the driver's driving skill. Accordingly, the first output processing unit 65 may stop outputting the sound. This makes it possible to avoid providing the driver with inaccurate evaluation. It is also possible to prevent the driver's driving operation from being brought into an inappropriate operation state on the basis of the inaccurate evaluation. The traveling environment in which the behavior stability of the vehicle 10 lowers may be identified on the basis of, for example, a road surface condition of the travel route and the number of other vehicles estimated on the basis of the detection data by the vehicle surrounding situation detection device 13. The unpaved road may be identified on the basis of a change in the vertical acceleration rate in a vertical direction of the vehicle body included in the measurement data inputted from the vehicle body behavior measurement device 11.

(2-7-6. Second Output Processing Unit)

With the control mode set to the second control mode, the second output processing unit 67 of the processor 53 carries out processing of outputting a reward sound, each time the vehicle 10 travels through a predetermined segment of a planned travel route of the vehicle 10. The reward sound corresponds to the behavior stability of the vehicle 10 in the predetermined segment traveled. In this embodiment, each time the vehicle 10 travels through the predetermined segment, the second output processing unit 67 calculates an evaluation value indicating the behavior stability of the vehicle 10, using the index value calculated by the data processing unit 63 on the basis of the measurement data measured in the relevant segment. The second output processing unit 67 converts the calculated evaluation value indicating the behavior stability into the output sound data. The second output processing unit 67 controls the driving of the sound output device 31 on the basis of the output sound data calculated, and generates the reward sound.

The predetermined segment serving as a unit for the calculation of the evaluation value may be, for example, a segment separated off for each predetermined travel distance, a segment separated off by predetermined travel time, or a segment separated off for each intersection provided with traffic lights. Evaluating the behavior stability for each segment and outputting the reward sound corresponding to the behavior stability makes it possible to output the reward sound at predetermined intervals. The reward sound is configured to give the driver the stronger sense of achievement, as the behavior stability is higher. Hence, it is possible to bring the driving operation state of the vehicle 10 into the driving operation state in which the behavior of the vehicle 10 is more stabilized.

The predetermined segment may be a preset specific segment. For example, in evaluating stability of the driver's steering operation state, the predetermined segment may be a straight-travel segment including a continuous straight road of a predetermined distance or more, or a cornering segment including a curve of a constant curvature. For example, in evaluating the driver's accelerator operation state or the driver's brake operation state, the predetermined segment may be a straight-travel segment including a continuous straight road of a predetermined distance or more. Whether or not the vehicle has traveled through these specific segments may be determined on the basis of the positional data regarding the vehicle 10 detected by the vehicle positional data detection device 17 and the map data of the navigation system.

For example, the second output processing unit 67 evaluates the behavior stability of the vehicle 10 each time the vehicle travels through the predetermined segment, by comparing a maximum value of the index value in the relevant segment with a predetermined threshold. The second output processing unit 67 sets the output sound corresponding to the behavior stability. Thus, the behavior stability is evaluated on the basis of the index value when the behavior becomes most unstable during the drive through the segment. In this case, as the maximum value of the index value is smaller, the behavior stability evaluated is higher. The maximum value of the index value is the absolute value of the acceleration rate, the angular velocity, the jerk, or the angular acceleration rate.

The threshold for the evaluation of the behavior stability of the vehicle 10 may be a variable value set on the basis of the level of the driver's driving skill. As the threshold is smaller, it is necessary to diminish the magnitude of the behavior of the vehicle 10 to enhance the behavior stability, leading to more stabilized behavior of the vehicle 10. There may be one threshold, or alternatively, there may be multiple thresholds. In a case with one threshold, it is determined that the behavior stability is high in a case where the maximum value of the index value is equal to or smaller than the threshold. It is determined that the behavior stability is low in a case where the maximum value of the index value exceeds the threshold. In a case with two thresholds, it is determined that the behavior stability is high in a case where the maximum value of the index value is equal to or smaller than a first threshold having a smaller value. It is determined that the behavior stability is moderate in a case where the maximum value of the index value exceeds the first threshold and is equal to or smaller than a second threshold having a larger value. It is determined that the behavior stability is low in a case where the maximum value of the index value exceeds the second threshold.

Each time the vehicle travels through the predetermined segment, the second output processing unit 67 may compare the index value in the relevant segment with a predetermined threshold. The second output processing unit 67 may take the number of times the index value exceeds the threshold as the evaluation value indicating the behavior stability of the vehicle 10, and set the output sound corresponding to the evaluation value. Taking the number of times the index value exceeds the threshold as the evaluation value makes it possible to avoid evaluating the behavior stability of the vehicle 10 on the basis of the index value when the index value exceeds the threshold only once while the vehicle is traveling through the relevant segment. Hence, it is possible to evaluate the behavior stability over the entire segment.

In this case, as the evaluation value is smaller, the behavior stability evaluated is higher. The evaluation value indicates the number of times the index value exceeds the threshold. The index value is the absolute value of the acceleration rate, the angular velocity, the jerk, or the angular acceleration rate. For example, in a case where the number of times the index value exceeds the threshold is zero, it is determined that the behavior stability is high. In a case where the number of times the index value exceeds the threshold is 1 to 3 both inclusive, it is determined that the behavior stability is moderate. In a case where the number of times the index value exceeds the threshold is 4 or more, it is determined that the behavior stability is low. The threshold may be a variable value set on the basis of the level of the driver's driving skill. As the threshold is smaller, it is necessary to diminish the magnitude of the behavior of the vehicle 10 to enhance the behavior stability, leading to more stabilized behavior of the vehicle 10. The number of times to be used in evaluating the behavior stability may also be set on the basis of the level of the driver's driving skill.

The second output processing unit 67 may set the threshold for the evaluation of the behavior stability of the vehicle 10 on the basis of the driver attribute data inputted from the input unit 19. For example, the second output processing unit 67 sets the threshold to a smaller value as the estimated driving skill is higher, and sets the threshold to a larger value as the estimated driving skill is lower, on the basis of the data regarding the driver's driving skill acquired as the driver attribute data. Thus, for example, in the case where the driver has the high driving skill and the behavior of the vehicle 10 is stable, the threshold is lowered. This necessitates enhancing the behavior stability of the vehicle 10 to generate the same reward sound, as compared to the driver having the low driving skill. Hence, it is possible to lead the driver with the high driving skill to further stabilization of the behavior of the vehicle 10. For the driver with the low driving skill, it is possible to lead the driver to the appropriate level of the behavior stability, depending on the driver's driving skill.

As the driver attribute data regarding the driver's driving skill, for example, one or more of the following pieces of data acquired through the input unit 19 may be used: the age of the driver; the number of years since licensing; how often the driver drives; and the number of years elapsed after a previous drive. In a case with an aged driver, the threshold is raised because there is high possibility that the driving skill is lowered. As the number of years since licensing is larger, the threshold is lowered because the estimated driving skill is high. As the driver drives more often, the threshold is lowered because the estimated driving skill is high. As the number of years elapsed after the previous drive is larger, i.e., as the blank period is longer, the threshold is raised because there is high possibility that the driving skill is lowered.

The second output processing unit 67 may adjust the threshold on the basis of data regarding the behavior stability during the previous drive of the same driver, in conjunction with the data acquired through the input unit 19. For example, the second output processing unit 67 may use data regarding the number of times the index value calculated by the data processing unit 63 exceeds the threshold during the previous drive of the same driver, i.e., data regarding how often the index value exceeds the threshold during the previous drive of the same driver. In this case, as the number of times the index value exceeds the threshold is smaller, i.e., the index value exceeds the threshold less often, the threshold is lowered because the estimated driving skill is high. Alternatively, the second output processing unit 67 may use data regarding the evaluation of the behavior stability obtained during the previous drive of the same driver. In this case, as the evaluation of the behavior stability is higher, the threshold is lowered because the estimated driving skill is high.

The second output processing unit 67 may change the number of the thresholds on the basis of the driver attribute data that makes it possible to estimate the driver's driving skill. In this case, as the driver's driving skill estimated is higher, the number of the thresholds is increased. As the number of the thresholds is larger, it is possible to present the driver with more details of the behavior stability of the vehicle 10.

The reward sound to be outputted in the second output control mode is a sound configured to give the driver the stronger sense of achievement as the behavior stability of the vehicle 10 is higher. The reward sound varies with the behavior stability or the evaluation value calculated. The reward sound may be a sound that gives the driver comfort, such as a sound of winning medals, a sound of applause, a sound of fireworks, or a chord including notes of different pitches or tones.

For example, in a case where the reward sound is the sound of winning medals, the number of medals to be won is set to increase as the behavior stability of the vehicle 10 is higher. The sound of winning medals may be, for example, an impact sound of a metal coin dropped on a hard floor. In a case where the reward sound is the sound of applause, the number of people applauding is set to increase as the behavior stability of the vehicle 10 is higher. In a case where the reward sound is the sound of fireworks, the number of fireworks is set to increase as the behavior stability of the vehicle 10 is higher. In a case where the reward sound is the chord, the number of the notes is set to increase as the behavior stability of the vehicle 10 is higher.

The reward sound to be set is not limited to these examples. For example, the volume or the pitch may be changed in place of or in conjunction with changing the number of the medals to be won, the number of people applauding, the number of fireworks, or the number of the notes in the chord. In this case, setting the volume to be larger or setting the pitch to be lower as the behavior stability of the vehicle 10 is higher makes it possible to give the driver the stronger sense of achievement. In the case where the reward sound is the sound of winning medals, the sound of applause, or the sound of fireworks, the tempo of the sound to be outputted may be changed. In this case, setting the tempo to be faster as the behavior stability of the vehicle 10 is higher makes it possible to give the driver the stronger sense of achievement. In the case where the reward sound is the chord, when the behavior stability of the vehicle 10 is high, the reward sound may be set to the chord. When the behavior stability of the vehicle 10 is low, the reward sound may be set to a discord in which one or more of the notes in the chord is sharped or flatted.

In a case where the behavior stability is evaluated using multiple pieces of data among the acceleration rate, the angular velocity, the jerk, or the angular acceleration rate, the second output processing unit 67 may evaluate the behavior stability on the basis of the index values of the respective pieces of data. In this case, the second output processing unit 67 may compare each of the index values with a threshold, and combine evaluation results for the respective index values, to set the number of medals to be won, the number of people applauding, the number of fireworks, or the number of the notes. Alternatively, a threshold and the kind of the reward sound may be set for each of the multiple pieces of data, and the second output processing unit 67 may set the output sound for each piece of data on the basis of relation between the index value for each piece of data and the threshold, and output the output sound as one reward sound.

Moreover, the reward sounds independent from each other may be imparted to evaluation of longitudinal behavior of the vehicle body and evaluation of lateral behavior of the vehicle body. This makes it possible to give the driver a recognition of the behavior stability attained by their driving operation, separately for the longitudinal behavior and the lateral behavior of the vehicle body.

As described, the second output processing unit 67 sets the tone or the kind of the reward sound to the tone or the kind selected by the user such as the driver, calculates the data indicating the behavior stability of the vehicle 10 on the basis of the index value calculated by the data processing unit 63, and sets the reward sound corresponding to the calculated behavior stability. Thus, the index value calculated by the data processing unit 63 is converted into the output sound data.

Moreover, in a case with consecutive segments in each of which the behavior stability of the vehicle 10 is high, the second output processing unit 67 may generate a sound effect different from the normal reward sound. This makes it possible to motivate the driver to continue the driving operation state in which the behavior of the vehicle 10 is stable. For example, in a case where the number of the consecutive segments in each of which the index value calculated by the data processing unit 63 does not exceed the threshold reaches the preset value, the second output processing unit 67 generates the sound effect instead of or together with the reward sound. The sound effect is a sound that gives the driver the sense of achievement. In one example, the sound effect is a sound that gives the driver the stronger sense of achievement than the reward sound, e.g., a fanfare.

For example, in a case where the behavior stability or the evaluation value is calculated using one threshold, a predetermined sound effect is generated each time the number of the consecutive segments in each of which the index value calculated from the measurement data in the relevant segment does not exceed the threshold reaches a preset value. In a case where the behavior stability or the evaluation value is calculated using multiple thresholds, a predetermined sound effect is generated each time the number of the consecutive segments in each of which the index value calculated from the measurement data in the relevant segment does not exceed a maximum threshold of the multiple thresholds reaches a preset value. Alternatively, different sound effects may be set for respective thresholds, and a predetermined sound effect may be generated each time the number of the consecutive segments in each of which the index value does not exceed each of the thresholds reaches a preset value.

The second output processing unit 67 controls the driving of the sound output device 31 on the basis of the calculated output sound data, and generates the reward sound. In this embodiment, the second output processing unit 67 allows the reward sound of the set tone or the set kind to be outputted in a mode corresponding to the behavior stability, each time the vehicle travels through the predetermined segment.

The second output processing unit 67 may set a condition of the data processing by the data processing unit 63 on the basis of the driver attribute data. For example, the second output processing unit 67 may set, on the basis of the driver attribute data, the number of the kinds of the data to be used in calculating the index value indicating the magnitude of the behavior of the vehicle 10 in the data processing unit 63.

In this case, the second output processing unit 67 increases the number of the kinds of the data to be used in calculating the index value, as the driver's driving skill estimated from the driver attribute data is higher. The second output processing unit 67 decreases the number of the kinds of the data to be used in calculating the index value, as the driver's driving skill estimated is lower. Thus, for example, in the case where the driver has the high driving skill and the behavior of the vehicle 10 is stable, the driving operation state is evaluated on the basis of the larger number of the kinds of the data. Hence, it is possible to lead the driver to further stabilization of the behavior of the vehicle 10. For the driver having the low driving skill, the driving operation state is evaluated on the basis of the relatively small number of pieces of the data. This leads to the appropriate level of the behavior stability, depending on the driver's driving skill.

In the case where the number of the kinds of the data to be used in calculating the index value is increased or decreased, giving priority to using the data regarding the lateral jerk or the angular acceleration rate of the yaw angle, regardless of the number of the kinds of the data to be used, makes it easier to evaluate the driver's steering operation state. Moreover, giving priority to using the data regarding the longitudinal jerk or the angular acceleration rate of the roll angle makes it easier to evaluate the driver's accelerator operation state and the driver's brake operation state.

The setting of the threshold on the basis of the driver attribute data and the increase or the decrease in the number of the kinds of the data to be used in calculating the index value may be performed in accordance with the example summarized in FIG. 3. For example, let us assume a case where the behavior stability is evaluated using a first threshold and a second threshold, and the first threshold is smaller than the second threshold (first threshold<second threshold). In this case, the second output processing unit 67 raises or lowers the threshold on the basis of the driver attribute data and increases or decreases the number of the kinds of the data, with respect to preset reference values of the first threshold and the second threshold. For example, in a case where the index value is calculated as an index value of 0 to 100 both inclusive, the first threshold and the second threshold may be increased or decreased by multiplying the reference values of the first threshold and the second threshold by a coefficient less than 1 or a coefficient larger than 1 on the basis of each piece of the data. The reference value of the first threshold is assumed to be "30" and the reference value of the second threshold is assumed to be "60".

Alternatively, let us assume a case where the data available for the evaluation of the behavior stability includes the following 12 pieces of data: the longitudinal acceleration rate; the lateral acceleration rate; the vertical acceleration rate; the angular velocity of the yaw angle; the angular velocity of the pitch angle; the angular velocity of the roll angle; the longitudinal jerk; the lateral jerk; the vertical jerk; the angular acceleration rate of the yaw angle; the angular acceleration rate of the pitch angle; and the angular acceleration rate of the roll angle. In this case, the reference number of pieces of the data to be used is assumed to be 5. The number of pieces of the data is increased or decreased one by one, on the basis of each piece of the data, to set the number of pieces of the data to be used. Note that the number of the thresholds and the number of the kinds of the data are increased or decreased within a range of a preset maximum value to a preset minimum value.

The coefficient for raising or lowering the threshold and the amount of the increase or decrease in increasing or decreasing the number of the kinds of the data may be constant regardless of the kinds of the data, and may be weighted in accordance with the kinds of the data.

In the following, with reference to FIGS. 7 and 8, description is given of examples of the data conversion processing, the sound conversion processing, and the condition setting processing in the second output control mode. In the following, an example is described in which the predetermined segment in which the behavior stability of the vehicle 10 is evaluated is defined as a segment separated off by predetermined travel time. Each time the vehicle travels through the predetermined segment, the absolute value of the lateral jerk is compared with a first threshold thre1 and a second threshold thre2 to generate the reward sound. A value of the lateral jerk is obtained from the data regarding the measured lateral acceleration rate.

FIG. 7 is an explanatory diagram illustrating an example of the sound conversion processing by the second output processing unit 67. FIG. 7 illustrates an example where the behavior stability is evaluated using the value of the lateral jerk as the index value to set the reward sound. The value of the lateral jerk is obtained from the measurement data regarding the lateral acceleration rate detected by the acceleration rate sensor as one of the sensors of the vehicle body behavior measurement device 11.

As with the first output control mode, the data processing unit 63 carries out the smoothing process and the absolute value conversion process on the measurement data regarding the lateral acceleration rate, to convert the measurement data regarding the lateral acceleration rate into the data regarding the absolute value of the lateral acceleration rate. Furthermore, the data processing unit 63 carries out the time differentiation process, to convert the measurement data regarding the lateral acceleration rate into data regarding the absolute value of the lateral jerk. See FIG. 4. As illustrated in FIG. 7, each time the vehicle travels through each of segments seg1 to seg5, the second output processing unit 67 sets the reward sound on the basis of a result of comparison of a maximum value of the absolute value of the lateral jerk, i.e., the index value, in each of the segments seg1 to seg5 with the first threshold thre1 and the second threshold thre2. In one example, in the first segment seg1, the maximum value of the index value is equal to or smaller than the first threshold thre1. Accordingly, the second output processing unit 67 sets the reward sound to a first reward sound. In the second segment seg2, the fourth segment seg4, and the fifth segment seg5, the maximum value of the index value exceeds the first threshold thre1 and is equal to or smaller than the second threshold thre2. Accordingly, the second output processing unit 67 sets the reward sound to a second reward sound. In the third segment seg3, the maximum value of the index value exceeds the second threshold thre2. Accordingly, the second output processing unit 67 sets the reward sound not to be outputted.

In this case, when the index value exceeds the largest threshold, e.g., the second threshold thre2 in the example of FIG. 7, while the vehicle is traveling through each of the segments, the second output processing unit 67 may end the current segment and start the next segment. In one example, in the case where the segments are separated off by the travel time or the travel distance, when the index value exceeds the largest threshold while the vehicle is traveling through the current segment, the counting of the time or the distance may be reset and the counting of the travel time or the travel distance for the next segment may be started. Thus, even in a case where the behavior of the vehicle 10 is intensified only for a moment, the reward sound is outputted if the behavior stability of the vehicle 10 becomes higher afterwards. This makes it easier for the driver to have the sense of achievement.

FIG. 8 is a table summarizing a setting example of the first reward sound and the second reward sound. In the example illustrated in FIG. 7, the first reward sound is set in a case where the behavior stability is high, and the second reward sound is set in a case where the behavior stability is moderate. In the case where the kind of the reward sound is set to the sound of winning medals, the number of medals to be won for the first reward sound is set to 2, and the number of medals to be won for the second reward sound is set to 1. In the case where the kind of the reward sound is set to the sound of applause, the first reward sound is set to a sound of applause by two or more persons, and the second reward sound is set to a sound of applause by one person. In the case where the kind of the reward sound is set to the sound of fireworks, the first reward sound is set to a sound of two or more fireworks, and the second reward sound is set to a sound of one firework. In the case where the kind of the reward sound is set to the chord, the first reward sound is set to a chord of five notes, and the second reward sound is set to a chord of three notes.

In this way, the reward sound corresponding to the behavior stability of the vehicle 10 is outputted. Hence, it is possible to make audible the behavior stability of the vehicle 10, making it possible to give the driver the real-time recognition of the evaluation of their driving operation state, without distracting the driver's attention, during the travel of the vehicle.

Figure 9:
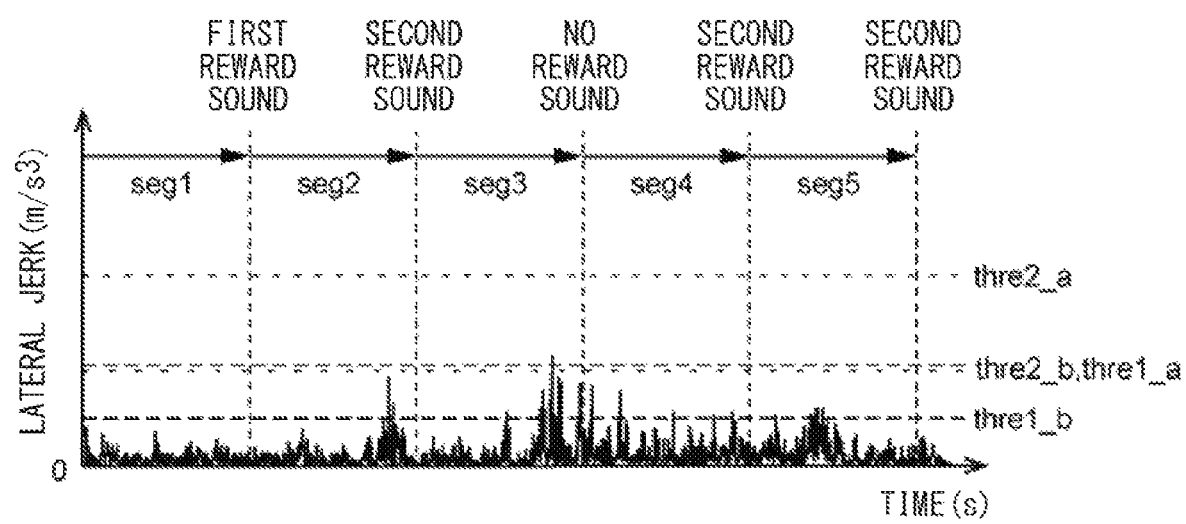
FIG. 9 is a diagram illustrating an example where a threshold in the second output control mode is changed, by the driver assistance apparatus according to the embodiment.

Description is given next, with reference to FIGS. 7 and 9, of an example where the setting of the thresholds is changed with differences in the driver's driving skill. FIG. 9 is an explanatory diagram illustrating an example in which the first threshold and the second threshold are lowered in accordance with the driver's driving skill. FIG. 7 illustrates the absolute value of the lateral jerk obtained from the driving operation of the driver having the low driving skill. FIG. 9 illustrates the absolute value of the lateral jerk obtained from the driving operation of the driver having the high driving skill. The first threshold thre1_a and the second threshold thre2_a in FIG. 9 correspond to the first threshold thre1 and the second threshold thre2 illustrated in FIG. 7.

As illustrated in FIG. 7, as for the driving operation of the driver having the low driving skill, the absolute value of the lateral jerk, i.e., the index value, becomes relatively large. Accordingly, the first threshold thre1_a and the second threshold thre2_a are set to relatively large values. As illustrated in FIG. 9, as for the driving operation of the driver having the high driving skill, the absolute value of the lateral jerk, i.e., the index value, becomes relatively small. Accordingly, the first threshold thre1 b and the second threshold thre2 b are set to relatively small values. In the example illustrated in FIG. 9, the first threshold thre1 b and the second threshold thre2 b takes values obtained respectively by multiplying the first threshold thre1_a and the second threshold thre2_a by 0.5.

In a case where the first threshold thre1 a and the second threshold thre2_a are directly applied to the data regarding the absolute value of the lateral jerk illustrated in FIG. 9, the reward sounds in the first segment seg1, the second segment seg2, the fourth segment seg4, and the fifth segment seg5 are set to the first reward sound, and the reward sound in the third segment seg3 is set to the second reward sound. In contrast, in a case where the first threshold thre1 b and the second threshold thre2 b are applied to the data regarding the absolute value of the lateral jerk illustrated in FIG. 9, the reward sound in the first segment seg1 is set to the first reward sound. The reward sounds in the second segment seg2, the fourth segment seg4, and the fifth segment seg5 are set to the second reward sound. The reward sound in the third segment seg3 is set not to be outputted. Accordingly, the higher the driver's driving skill, the higher the behavior stability to be involved in outputting the first reward sound and the second reward sound. This leads to the driving operation state that enhances the behavior stability more.

Moreover, the second output processing unit 67 may stop outputting the sound in the traveling environment in which the behavior stability of the vehicle 10 lowers. For example, in the travel scene along an unpaved road such as a gravel road, or in the scene of traveling while avoiding other vehicles, e.g., in congestion, the behavior stability of the vehicle 10 lowers easily regardless of the driver's driving skill. Thus, the second output processing unit 67 stops outputting the sound. This makes it possible to avoid providing the driver with the inaccurate evaluation. It is also possible to prevent the driver's driving operation from being brought into the inappropriate operation state on the basis of the inaccurate evaluation. The traveling environment in which the behavior stability of the vehicle 10 lowers may be identified on the basis of the road surface condition of the travel route and the number of other vehicles estimated on the basis of detection data by, for example, an external view photographing camera, LiDAR (Light Detection and Ranging or Laser Imaging Detection and Ranging), or a radar sensor. The unpaved road may be identified on the basis of the change in the vertical acceleration rate in the vertical direction of the vehicle body included in the measurement data inputted from the vehicle body behavior measurement device 11.

(2-7-7. Control Mode Setting Unit)

The control mode setting unit 69 of the processor 53 carries out processing of setting the control mode of outputting the sound to the first output control mode or the second output control mode depending on a predetermined determination condition. As described, in the first output control mode, it is possible to give the driver the real-time, intuitive recognition of the change in the behavior stability of the vehicle 10 through the auditory stimulation during a drive. In the second output control mode, the output sound is the reward sound that gives the driver the sense of achievement. This makes it possible to motivate the driver to make the driving operation that stabilizes the behavior of the vehicle 10 more. The control mode setting unit 69 switches the control mode to the optimum control mode in accordance with the situation, in consideration of the characteristics of these two control modes. Hence, it is possible to bring more effectively the driver's driving operation of the vehicle 10 into the driving operation state that enhances the behavior stability.

For example, the control mode setting unit 69 sets the control mode to the first output control mode or the second output control mode, with one or more of the driving environment of the vehicle 10, the driver's motivation to improve driving operation skill, the driver's driving habit, the driver's previous use history of the auditory stimulation control, and accustomedness to the auditory stimulation, as the determination condition.

(Determination Based on Driving Environment)

In one example, the control mode setting unit 69 may set the control mode, using the driving environment of the vehicle 10 as the determination condition, as follows. For example, in a case with a short inter-vehicle distance to a vehicle traveling ahead, or a preceding vehicle, the control mode setting unit 69 selects the first output control mode rather than the second output control mode. In the first output control mode, the driving operation is made on the basis of the real-time recognition of the behavior stability of the vehicle 10. In the second output control mode, there is possibility of a delay in timing of braking by the driver presented with the auditory stimulation. In one example, the control mode setting unit 69 sets the control mode to the first output control mode in a case where the inter-vehicle distance to the preceding vehicle or grace time until collision is shorter than a preset threshold. The grace time until collision is obtained on the basis of the inter-vehicle distance to the preceding vehicle and a relative speed. Hence, it is possible to reduce a risk of rear-end collision in a case where the inter-vehicle distance to the preceding vehicle suddenly decreases.

In a situation where the behavior of the vehicle 10 easily changes with road conditions or influences of other vehicles nearby, it is considered desirable to make the driving operation in accordance with the change in the behavior of the vehicle 10. Accordingly, in such a situation, the control mode setting unit 69 sets the first output control mode in which the driving operation is made on the basis of the real-time recognition that the behavior stability of the vehicle 10 is lowering. In a situation where the behavior of the vehicle 10 hardly changes, it is considered desirable to maintain the stable behavior of the vehicle 10. Accordingly, in such a situation, the control mode setting unit 69 selects the second output control mode. In one example, the control mode setting unit 69 sets the control mode to the first output control mode, in traveling along a curve or in traveling in an urban area with many other vehicles. The control mode setting unit 69 sets the control mode to the second output control mode, in traveling along a straight road or in a case with few other vehicles nearby.

The control mode setting unit 69 may determine the driving environment of the vehicle 10 on the basis of the vehicle surrounding situation data regarding the vehicle 10 detected by the vehicle surrounding situation detection device 13. The control mode setting unit 69 may determine the road condition on the basis of the position of the vehicle 10 on the map data detected by the vehicle positional data detection device 17. The control mode setting unit 69 may acquire data regarding other vehicles, using a vehicle-to-vehicle communication device, and determine the number of other vehicles nearby.

(Determination Based on Motivation to Improve Driving Operation Skill)

The control mode setting unit 69 may set the control mode, using the driver's motivation to improve the driving operation skill as the determination condition, as described below. The first output control mode is a mode that gives the driver a recognition of behavior instability of the vehicle 10. In a case with a driver who is not so highly motivated to improve the driving operation skill, the first output control mode may possibly diminish an effect of stabilizing the behavior of the vehicle 10. Accordingly, the control mode setting unit 69 sets the control mode to the second output control mode in the case with the driver who is not so highly motivated to improve the driving operation skill. Meanwhile, in a case where a driver is highly motivated to improve the driving operation skill, the effect of stabilizing the behavior of the vehicle 10 is plausibly enhanced by informing the driver of many points for improvement. Thus, the control mode setting unit 69 sets the control mode to the first output control mode in the case where the driver is highly motivated to improve the driving operation skill.

The control mode setting unit 69 may determine the driver's motivation to improve the driving operation skill on the basis of, for example, the data inputted through the input unit 19 in the form of the questionnaire in which, for example, the driver answers the questions presented by the data processing device 50. Alternatively, the control mode setting unit 69 may determine the driver's motivation to improve the driving operation skill by referring to data regarding a determination made in advance as to the driver's motivation to improve the driving operation skill.

(Determination Based on Driving Habit)

The control mode setting unit 69 may set the control mode, using the driver's driving habit as the determination condition, as follows. Drivers having low driving operation skill or drivers having few driving experiences sometimes do not know what driving operation to make to stabilize the behavior of the vehicle 10. In the case where the driver has low driving operation skill or few driving experiences, the control mode setting unit 69 sets the control mode to the second output control mode, instead of selecting the first output control mode that gives the driver the recognition of the behavior instability of the vehicle 10.

The control mode setting unit 69 is configured to determine the driver's driving operation skill on the basis of the data inputted through the input unit 19 in the form of the questionnaire in which, for example, the driver answers the questions presented by the data processing device 50. Alternatively, the control mode setting unit 69 may determine the driver's driving operation skill by referring to the data obtained by the determination made in advance as to the driver's driving operation skill. In another alternative, the control mode setting unit 69 may determine the driver's driving operation skill by referring to the driver's driving operation history.

(Determination Based on Previous Use History of Auditory Stimulation Control)

The control mode setting unit 69 may set the control mode, using the driver's previous use history of the auditory stimulation control as the determination condition, as follows. For example, the control mode setting unit 69 selects whichever control mode has a high stabilization effect of the behavior of the vehicle 10 in the driving environment to be traveled, on the basis of a travel history of the vehicle 10 and a use history of a control of presenting the driver with the evaluation of the driver's driving operation state through the auditory stimulation. Hereinafter, the control of presenting the driver with the evaluation of the driver's driving operation state through the auditory stimulation is also referred to as an "auditory stimulation control". It is desirable that there is a travel history of the same driver traveling along the planned travel route. However, in a case without the travel history of the same driver, the control mode setting unit 69 may refer to travel histories of other drivers and a use history of the auditory stimulation control by other drivers while traveling.

In one example, let us assume a case with the use history of the auditory stimulation control in the first output control mode and the second output control mode when the driver travels along a certain mountain pass. In this case, when the driver travels along a similar mountain pass, the control mode setting unit 69 selects whichever control mode made the behavior of the vehicle 10 more stable. In a case without the driver's travel history along a similar mountain pass, the control mode setting unit 69 may refer to other drivers' travel histories along similar mountain passes, and selects whichever control mode made the behavior of the vehicle 10 more stable. Hence, it is possible to set the control mode to whichever control mode is more effective in stabilizing the behavior of the vehicle 10 in accordance with the planned travel route to be traveled.

(Determination Based on Accustomedness to Auditory Stimulation)

The control mode setting unit 69 may set the control mode, using the accustomedness to the auditory stimulation as the determination condition, as follows. Being accustomed to the auditory stimulation in the same control mode may possibly diminish the effect of stabilizing the behavior of the vehicle 10. Accordingly, the control mode setting unit 69 determines the effect of stabilizing the behavior of the vehicle 10 with the same control mode used continuously for a predetermined time or a predetermined travel distance. In a case where the effect of stabilizing the behavior of the vehicle 10 lowers, the control mode setting unit 69 switches the control mode.

3. Operation of Driver Assistance Apparatus

Description is given next of an example of control processing by the data processing device 50, as operation of the driver assistance apparatus according to this embodiment.

Figure 10:
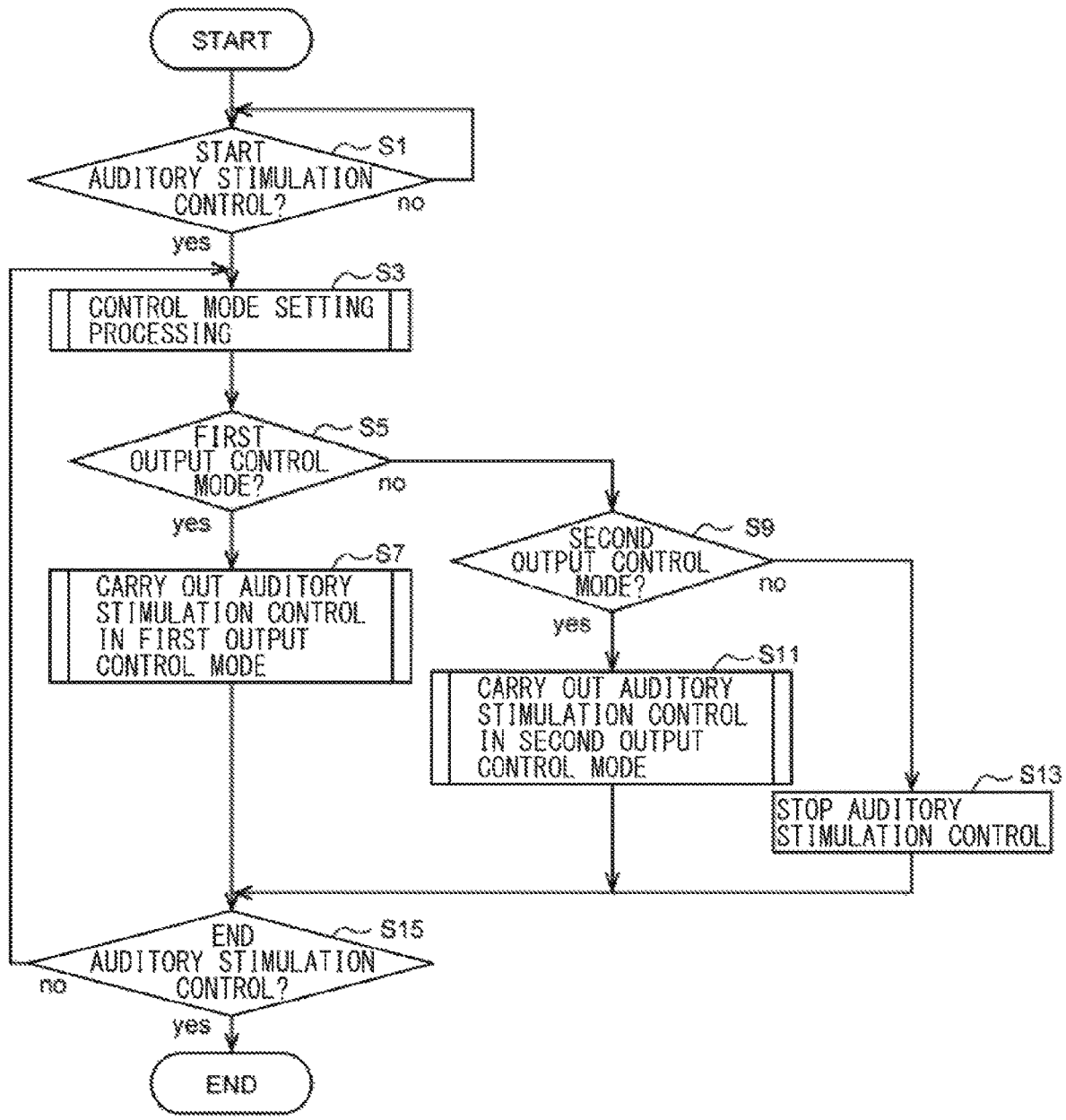
FIG. 10 is a flowchart of a main routine of auditory stimulation control processing by the driver assistance apparatus according to the embodiment.

FIG. 10 is a flowchart illustrating a main routine of the control processing by the processor 53 of the data processing device 50.

First, the processor 53 determines whether or not to start execution of the auditory stimulation control (step S1). There is no particular limitation on a condition that the execution of the auditory stimulation control is to be started. For example, in a case where the auditory stimulation control is carried out constantly while a driving system of the vehicle is in operation, the processor 53 may determine that the execution of the auditory stimulation control is to be started at a start-up of the driving system. Alternatively, the processor 53 may determine that the execution of the auditory stimulation control is to be started upon detecting the driver seated on the driver's seat on the basis of an output signal from a driver photographing camera or a load sensor installed in the driver's seat. In a case where an occupant such as the driver is allowed to switch on or off the execution of the auditory stimulation control, the processor 53 may determine that the execution of the auditory stimulation control is to be started when the execution of the auditory stimulation control is switched on, from a switch-off state.

In a case without a determination that the execution of the auditory stimulation control is to be started (S1/No), the processor 53 repeatedly carries out the determination process of step S1. In a case with the determination that the execution of the auditory stimulation control is to be started (S1/Yes), the control mode setting unit 69 of the processor 53 carries out the processing of setting the control mode (step S3). In the following, some examples of the processing of setting the control mode are described.

(Determination Based on Driving Environment)

Figure 11:
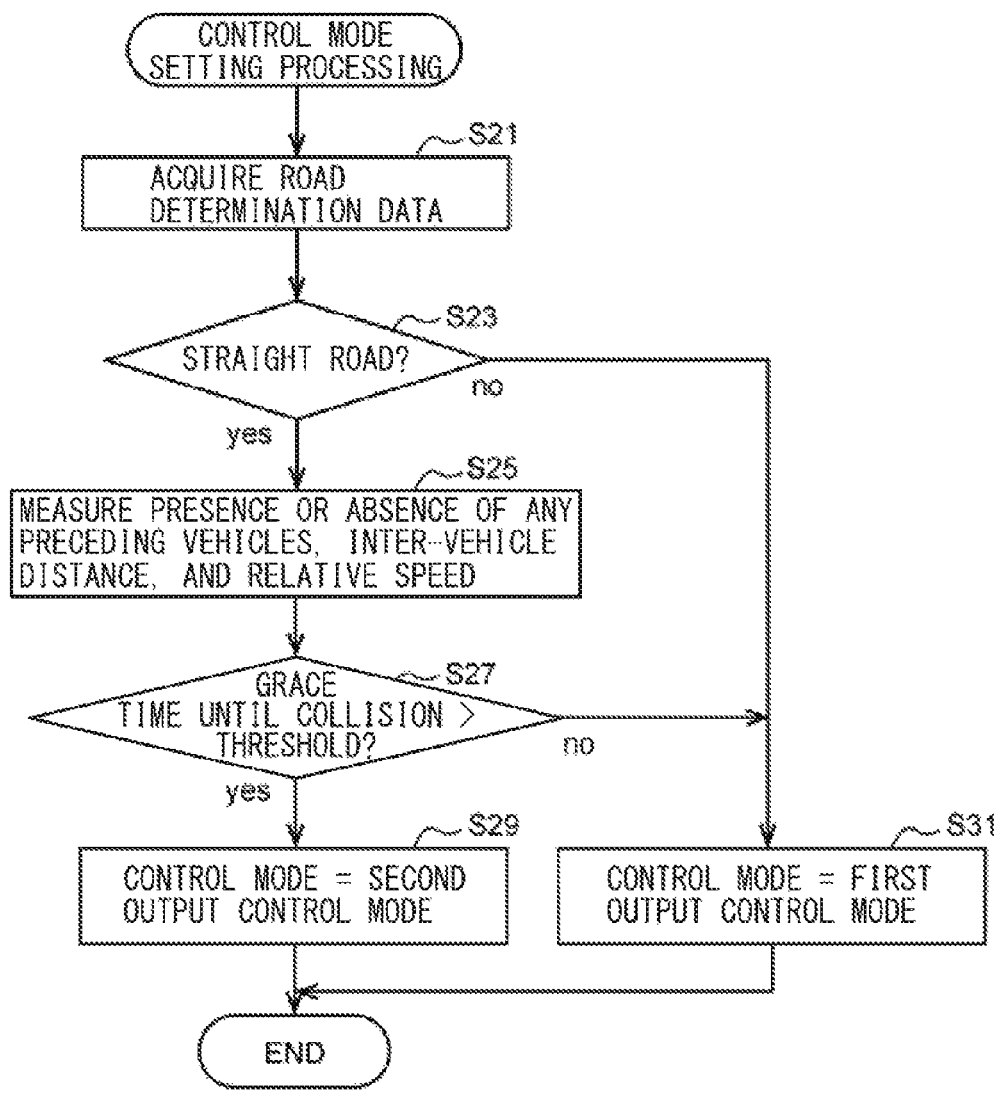
FIG. 11 is a flowchart of control mode setting processing based on driving environment of the vehicle as a determination condition, by the driver assistance apparatus according to the embodiment.

FIG. 11 is a flowchart illustrating an example of the processing of setting the control mode, using the driving environment of the vehicle 10 as the determination condition. First, the control mode setting unit 69 acquires the data to be involved in determining the road condition regarding a road to be traveled by the vehicle 10 (step S21). For example, the control mode setting unit 69 determines whether the position of travel of the vehicle 10 is in an urban area or whether the position of travel of the vehicle 10 is on a mountain road, on the basis of the position of the vehicle 10 on the map data detected by the vehicle positional data detection device 17. Alternatively, the control mode setting unit 69 may determine a curvature or a radius of curvature of the road to be traveled by the vehicle 10, on the basis of high-precision map data or the data detected by the vehicle surrounding situation detection device 13. In this case, for example, the control mode setting unit 69 may determine a road having a radius of curvature of 1000 m or more as a straight road, and determine a road having a radius of curvature of less than 1000 m as a curve. A reference value of the curvature or the radius of curvature may be set to any value. The method of determining whether a road shape is a straight road or whether the road shape is a curve is not limited to the example described above.

Thereafter, the control mode setting unit 69 determines whether or not the road related to the determination is a straight road (step S23). The control mode setting unit 69 determines whether or not the behavior of the vehicle 10 is easily changed under the influence of the road condition or other vehicles nearby. For example, the control mode setting unit 69 determines that the road is not a straight road, in a case where the vehicle 10 travels along a curve, in a case where the vehicle travels in an urban area with many other vehicles, or in a case where the vehicle travels on a mountain road with many curves.

In a case where the road is not a straight road (S23/No), the behavior of the vehicle 10 is easily changed under the influence of the road condition or other vehicles nearby. Accordingly, the control mode setting unit 69 sets the control mode to the first output control mode (step S31) to allow the driver to make the driving operation in accordance with the change in the behavior of the vehicle 10. This makes it possible for the driver to make the driving operation with the real-time recognition that the behavior stability of the vehicle 10 is lowering.

In a case where the road is a straight road (S23/Yes), the control mode setting unit 69 measures presence or absence of any preceding vehicles, and if any preceding vehicle present, an inter-vehicle distance and a relative speed to the preceding vehicle (step S25). The presence or absence of the preceding vehicle, the inter-vehicle distance to the preceding vehicle, and the relative speed may be acquired on the basis of the data detected by the vehicle surrounding situation detection device 13.

Thereafter, the control mode setting unit 69 determines whether or not the grace time until collision with the preceding vehicle exceeds a preset threshold (step S27). The grace time until collision is calculated on the basis of the inter-vehicle distance to the preceding vehicle and the relative speed. In a case where the grace time until collision is equal to or shorter than the threshold (S27/No), the inter-vehicle distance is small in relation to the relative speed to the preceding vehicle. Accordingly, the control mode setting unit 69 sets the control mode to the first output control mode, to prevent a delay in the timing of braking by the driver presented with the auditory stimulation. Hence, it is possible to reduce the risk of rear-end collision in the case where the inter-vehicle distance to the preceding vehicle suddenly decreases.

In a case where the grace time until collision is equal to or longer than the threshold (S27/No), the inter-vehicle distance is sufficient. Accordingly, the control mode setting unit 69 sets the control mode to the second output control mode (step S29). On a straight road, the behavior of the vehicle 10 hardly changes, and possibility is low that the inter-vehicle distance to the preceding vehicle rapidly decreases. Accordingly, the control mode setting unit 69 selects the second output control mode, to maintain the stable behavior of the vehicle 10. The second output control mode keeps the sound corresponding to the behavior of the vehicle 10 from being outputted in real time. Hence, it is possible to maintain the stable behavior of the vehicle 10.

The threshold for the grace time until collision may be set to any value. Moreover, the control mode setting unit 69 may determine whether or not the inter-vehicle distance to the preceding vehicle exceeds a threshold, instead of the grace time until collision. Alternatively, the control mode setting unit 69 may determine whether or not the number of other vehicles traveling around the vehicle 10 or the number of bicycles or pedestrians exceeds a threshold.

(Determination Based on Driver's Habit)

Figure 12:
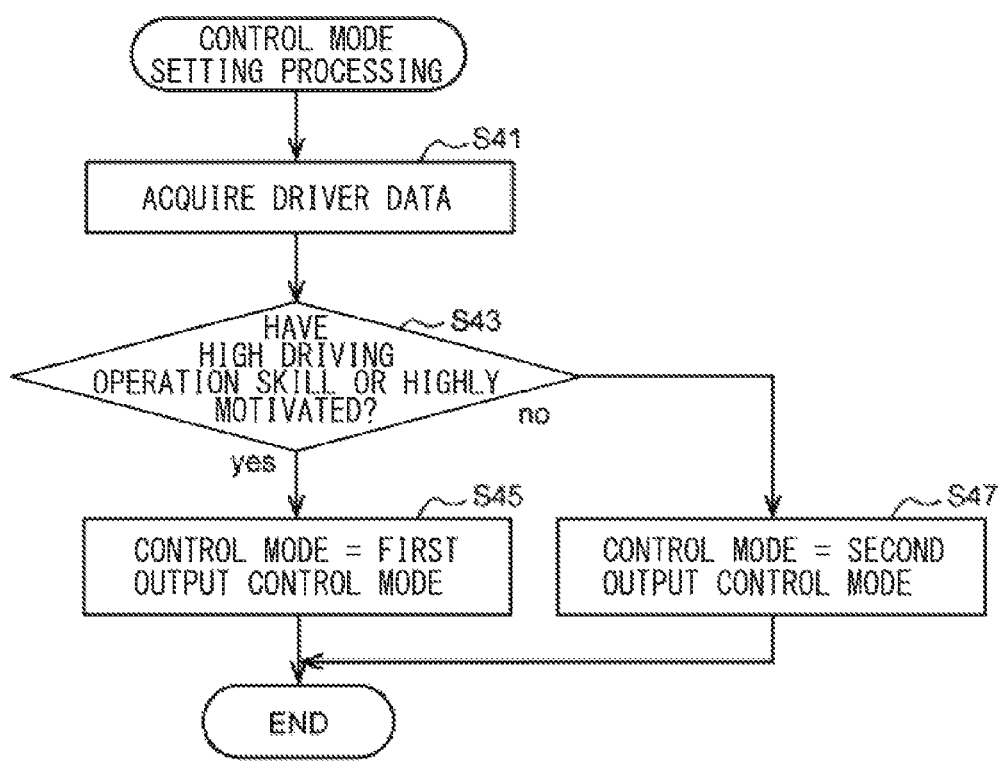
FIG. 12 is a flowchart of the control mode setting processing based on a habit of a driver who drives the vehicle as the determination condition, by the driver assistance apparatus according to the embodiment.

FIG. 12 is a flowchart illustrating an example of the processing of setting the control mode, using the habit of the driver of the vehicle 10 as the determination condition. Here, as the driver's habit, the data regarding the driver's driving operation skill or the data regarding the motivation to improve the driving operation skill is used.

First, the control mode setting unit 69 acquires the data regarding the driver held in the storage 55 (step S41). The driver's driving operation skill or the motivation to improve the driving operation skill may be determined on the basis of the data inputted through the input unit 19 in the form of the questionnaire in which, for example, the driver answers the questions presented by the data processing device 50. The control mode setting unit 69 may refer to the data regarding the determination made in advance as to the driver's driving operation skill or the motivation to improve the driving operation skill. In one example, the control mode setting unit 69 may determine the driver's driving operation skill on the basis of the number of years since licensing, how often the driver drove in the past one year, how long or how far the driver drove in the past one year, and the number of days elapsed after a previous drive. The control mode setting unit 69 may refer to a history of the driver's driving operations, and determine the driver's driving operation skill on the basis of the behavior stability such as a cumulative value of the acceleration rate or the jerk, the number of times the threshold is exceeded, the number of times the correction operation is made. For example, the data to be involved in determining the driver's driving operation skill or the motivation to improve the driving operation skill is evaluated and held as "low" or "high" for each item.

Thereafter, the control mode setting unit 69 determines whether or not the driver's driving operation skill or the motivation to improve the driving operation skill is high (step S43). For example, the control mode setting unit 69 determines whether or not the driver's driving operation skill or the motivation to improve the driving operation skill is high, by calculating an average of "low" s or "high" s for the respective items of the data to be involved in determining the driver's driving operation skill or the motivation to improve the driving operation skill. However, there is no particular limitation on the method of determining whether or not the driver's driving operation skill or the motivation to improve the driving operation skill is high.

In a case where the driver's driving operation skill or the motivation to improve the driving operation skill is high (S43/Yes), the control mode setting unit 69 sets the control mode to the first output control mode (step S45). It is considered that the driver with the high driving operation skill understands what driving operation to make to stabilize the behavior of the vehicle 10. Accordingly, the control mode setting unit 69 selects the first output control mode that gives the real-time recognition of the behavior instability of the vehicle 10. This makes it possible to bring the driver's driving operation into the driving operation that stabilizes the behavior of the vehicle 10. Moreover, this provides more opportunities to inform the driver who is highly motivated to improve the driving operation skill, of points for improvement in the driving operation of the vehicle 10. Hence, it is possible to enhance the effect of stabilizing the behavior of the vehicle 10.

In a case where the driver's driving operation skill or the motivation to improve the driving operation skill is low (S43/No), the control mode setting unit 69 sets the control mode to the second output control mode (step S47). Drivers having low driving operation skill or drivers having few driving experiences sometimes do not know what driving operation to make to stabilize the behavior of the vehicle 10. Accordingly, the control mode setting unit 69 sets the control mode to the second output control mode instead of selecting the first output control mode that gives the recognition of the behavior instability of the vehicle 10. It is also possible to avoid giving frequently the recognition of the behavior instability of the vehicle 10 to the driver who is not so highly motivated to improve the driving operation skill. This reduces possibility that the effect of stabilizing the behavior of the vehicle 10 is lowered.

In an initial state in which no data regarding the driver is held, whether to use the first output control mode or whether to use the second output control mode may be determined in advance, or may be selected by the driver.

(Determination Based on Previous Use History of Auditory Stimulation Control)

Figure 13:
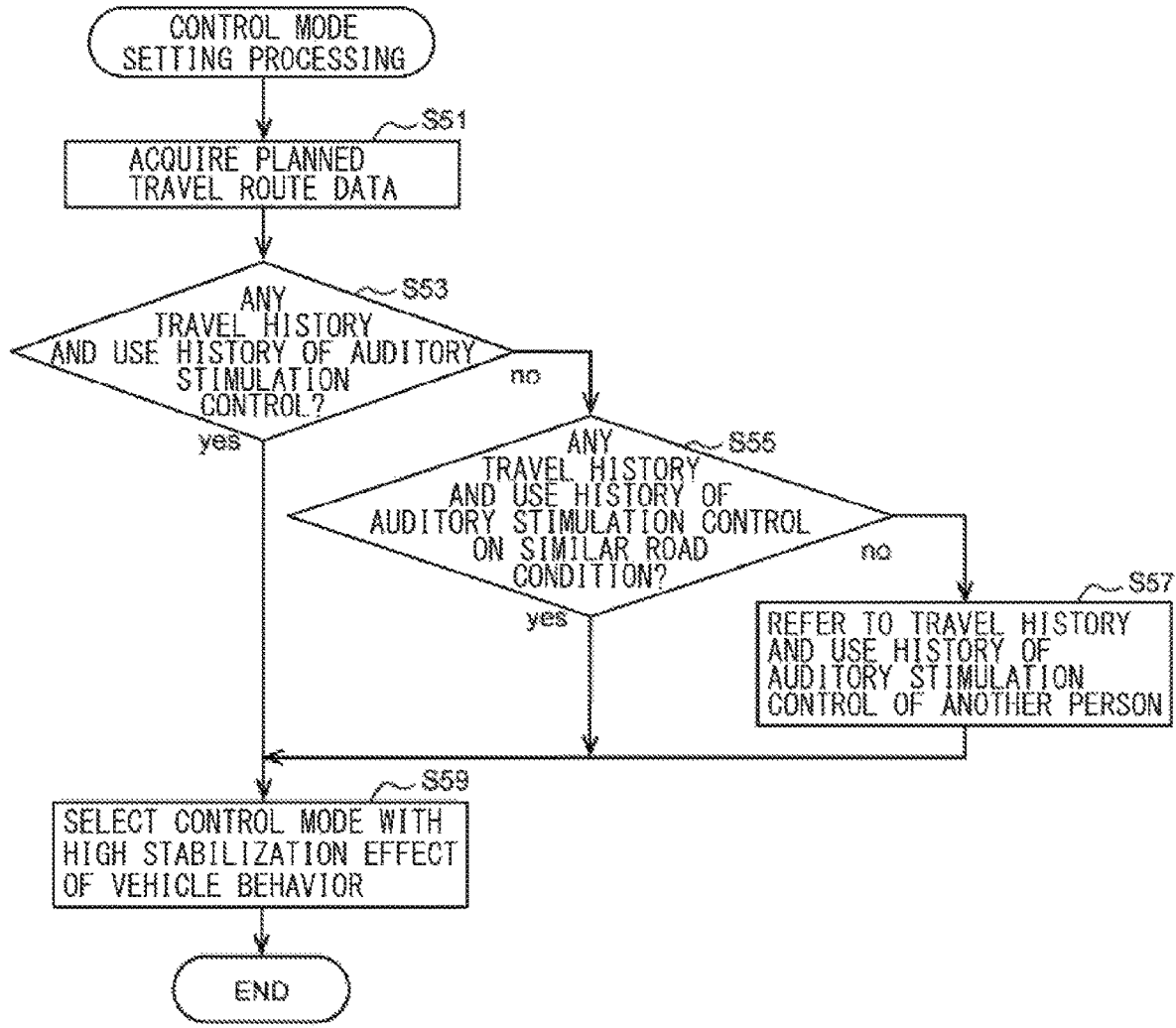
FIG. 13 is a flowchart of the control mode setting processing based on the driver's previous use history of the auditory stimulation control as the determination condition, by the driver assistance apparatus according to the embodiment.

FIG. 13 is a flowchart illustrating an example of the processing of setting the control mode, using the driver's previous use history of the auditory stimulation control as the determination condition. First, the control mode setting unit 69 acquires data regarding the planned travel route of the vehicle 10 (step S51). The data regarding the planned travel route may be obtained on the basis of, for example, the data regarding the position of the vehicle 10 on the map data detected by the vehicle positional data detection device 17 and a direction of travel of the vehicle 10. In a case where a travel route and a destination are set on the navigation system, data regarding the relevant travel route may be used. Moreover, the data regarding the planned travel route includes data regarding the road condition such as a road width, a radius of curvature of the road, the number of lanes, a road gradient, and a travel distance. For example, the control mode setting unit 69 refers to the high-precision map data held in the storage 55, a storage built in or coupled to the data processing device 50, or an external server configured to communicate by wireless communication, and acquires the data regarding the road condition of the corresponding planned travel route.

Thereafter, the control mode setting unit 69 refers to the driver's previous travel history and the use history of the auditory stimulation control, and determines whether or not the driver's previous travel history through the planned travel route and the use history of the auditory stimulation control at that time are held (step S53). The driver's previous travel history and the use history of the auditory stimulation control are accumulated as a database in the storage 55, the storage built in or coupled to the data processing device 50, or the external server configured to communicate by wireless communication. Table 1 summarizes an example of the database that holds the travel history and the use history of the auditory stimulation control. In the example summarized in Table 1, the maximum value of the absolute value of the lateral jerk is used as the "index value". The smaller the index value, the higher the behavior stability of the vehicle 10. In the example summarized in Table 1, a "point of start" is identified by a latitude and a longitude, but data that identifies the point of start may include any data that makes it possible to identify a position of the road traveled, e.g., an address or a road name.

TABLE 1

| Date Time | Point of Start [Latitude/ Longitude] | Road Width [m] | Radius of Curvature [m] | The Number of Lanes [—] | Gradient [%] | Travel Distance [m] | Control Mode | Index Value [m/s$^2$] |
|---|---|---|---|---|---|---|---|---|
| 2020 Dec. 9 9:30:00 | 35.23/ 139.10 | 5 | 60 | 1 | 0.5 | 200 | 2 | 120 |
| 2021 Jan. 3 13:12:00 | 35.20/ 139.12 | 5 | 60 | 1 | 0.5 | 200 | 1 | 100 |

The control mode setting unit 69 determines whether or not the histories accumulated in the database includes the travel history and the use history of the auditory stimulation control for the planned travel route acquired in step S51. In a case where the driver's previous travel history through the planned travel route and the use history of the auditory stimulation control at that time are held (S53/Yes), the control mode setting unit 69 refers to the use history held, and selects whichever control mode is highly effective in stabilizing the behavior of the vehicle 10 in traveling through the planned travel route (step S59). In the example of Table 1, the index value in the history with the date of recording on "2021/1/3" is smaller than the index value in the history with the date of recording on "2020/12/9". Accordingly, it is determined that the first output control mode is more effective in stabilizing the behavior of the vehicle 10 on the road condition of the planned travel route.

In a case where the driver's previous travel history through the planned travel route and the use history of the auditory stimulation control at that time are not held (S53/No), the control mode setting unit 69 determines whether or not the histories accumulated in the database includes the driver's travel history and the use history of the auditory stimulation control along a road on a similar road condition to that of the planned travel route (step S55). For example, the control mode setting unit 69 determines that the road condition is similar to that of the planned travel route in a case where an error between the value of each item of the road condition of the planned travel route and the value of each item of the road condition in the history held in the database falls within a preset allowable range. The allowable range of the error between the values for each item may be set to a range of, for example, ±10%, but the allowable range may be set to any range. Alternatively, the control mode setting unit 69 may truncate or round off the values for each item, and compare the resultant values. In a case where the resultant values are the same, the control mode setting unit 69 may determine that the road condition is similar to that of the planned travel route. Note that the method of determining presence or absence of the travel history and the use history of the auditory stimulation control along the road on the similar road condition to that of the planned travel route is not limited to the example described above, and the determination may be made on any determination condition.

In a case of the presence of the driver's travel history and the use history of the auditory stimulation control along the road on the similar road condition to that of the planned travel route (S55/Yes), the control mode setting unit 69 refers to the relevant use history and selects whichever control mode is highly effective in stabilizing the behavior of the vehicle 10 (step S59). In a case of the absence of the driver's travel history and the use history of the auditory stimulation control along the road on the similar road condition to that of the planned travel route (S55/No), the control mode setting unit 69 refers to a previous travel history of a driver other than the relevant driver through the planned travel route, or a previous travel history and a use history of the auditory stimulation control at that time along a road on the similar road condition to that of the planned travel route (step S57). Thus, the control mode setting unit 69 refers to the relevant use history and selects whichever control mode is highly effective in stabilizing the behavior of the vehicle 10 (step S59).

In an initial state of the database in which no data regarding the driver is held, or in a case where the database includes no histories of other drivers, which control mode to use, out of the first output control mode or the second output control mode, may be determined in advance. Alternatively, which control mode to use may be selected by the driver from the first output control mode and the second output control mode.

(Determination Based on Accustomedness to Auditory Stimulation)

Figure 14:
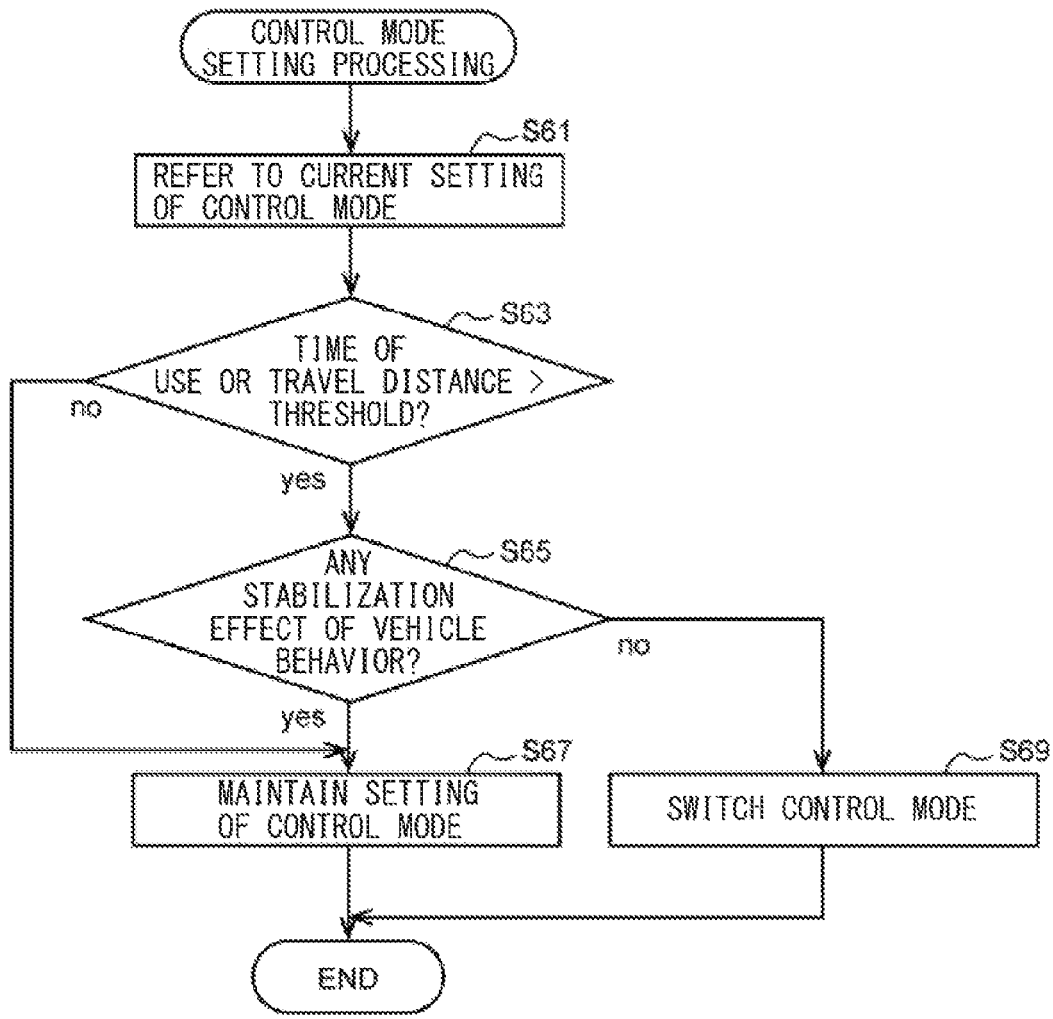
FIG. 14 is a flowchart of the control mode setting processing based on accustomedness to auditory stimulation as the determination condition, by the driver assistance apparatus according to the embodiment.

FIG. 14 is a flowchart illustrating an example of the processing of setting the control mode, using the accustomedness to the auditory stimulation as the determination condition. First, the control mode setting unit 69 refers to a current setting state of the control mode (step S61). Thereafter, the control mode setting unit 69 determines whether or not the time of use of the currently set control mode or the travel distance in the currently set control mode exceeds a preset threshold (step S63). The threshold may be set to any value. For example, the threshold of the time of use may range from 15 minutes to 60 minutes both inclusive, and the threshold of the travel distance may range from 10 km to 40 km both inclusive.

In a case where the time of use of the currently set control mode or the travel distance in the currently set control mode does not exceed the threshold (S63/No), it is not determined that the user is accustomed to the auditory stimulation control in the current control mode, and the control mode setting unit 69 maintains the current setting of the control mode (step S67). In a case where the time of use of the currently set control mode or the travel distance in the currently set control mode exceeds the threshold (S63/Yes), the control mode setting unit 69 determines presence or absence of the effect of stabilizing the behavior of the vehicle 10 while the current control mode is set (step S65).

Figure 15:
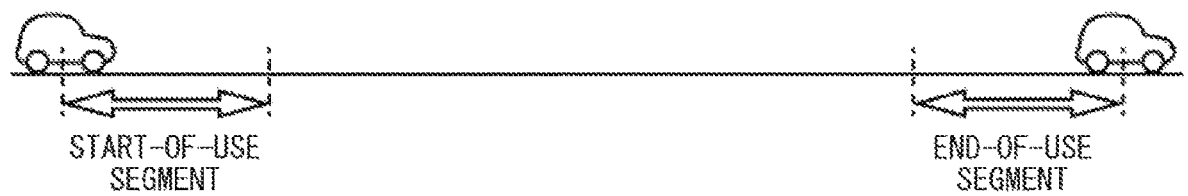
FIG. 15 is a diagram illustrating an example of a method of determining presence or absence of an effect of stabilizing vehicle behavior.

FIG. 15 is an explanatory diagram illustrating an example of a method of determining the presence or the absence of the effect of stabilizing the behavior of the vehicle 10. In the example illustrated in FIG. 15, the control mode setting unit 69 compares an initial index value with an eventual index value to determine the presence or the absence of the effect of stabilizing the behavior of the vehicle 10. The initial index value is the index value of the behavior of the vehicle 10 in a start-of-use segment in which the vehicle has traveled for certain time or distance after a start of the use of the current control mode. The eventual index value is the index value of the behavior of the vehicle 10 in an end-of-use segment in which the time of use or the travel distance is returned by certain time or distance from the time when the time of use or the travel distance exceeds the threshold. For example, in a case where the maximum value of the lateral jerk is assumed to be the index value, the smaller the index value, the higher the behavior stability of the vehicle 10. Accordingly, the control mode setting unit 69 determines the presence of the effect of stabilizing the behavior of the vehicle 10, in a case where a difference obtained by subtracting the eventual index value from the initial index value is equal to or larger than a preset threshold, or in a case where a ratio of the eventual index value to the initial index value is smaller than a preset threshold.

Figure 16:
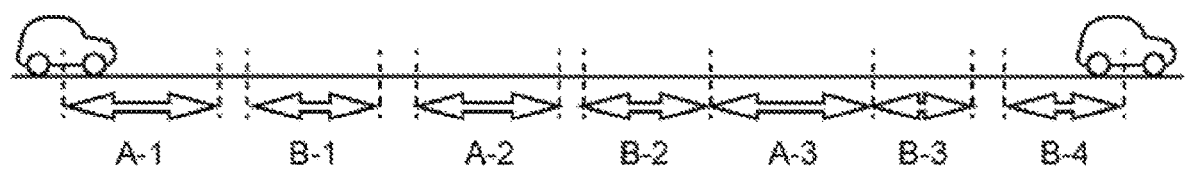
FIG. 16 is a diagram illustrating another example of the method of determining the presence or the absence of the effect of stabilizing the vehicle behavior.
Figure 17:
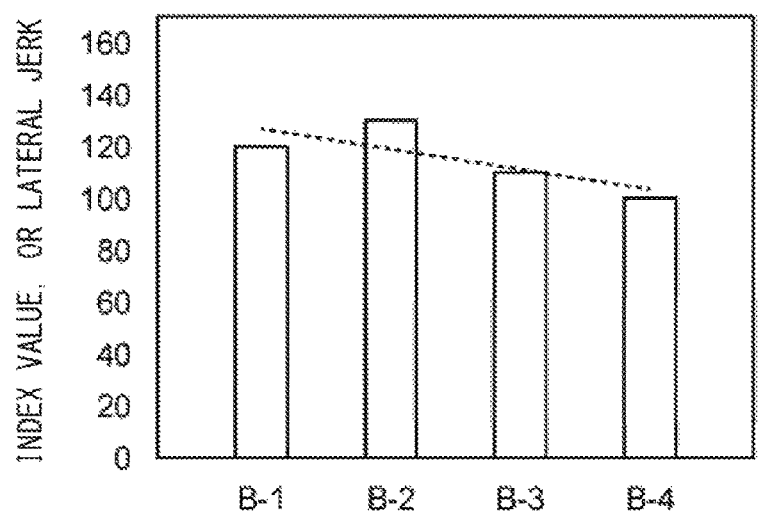
FIG. 17 is a diagram illustrating another example of the method of determining the presence or the absence of the effect of stabilizing the vehicle behavior.

FIGS. 16 and 17 are explanatory diagrams illustrating another example of the method of determining the presence or the absence of the effect of stabilizing the behavior of the vehicle 10. In a case where the road conditions on which the current control mode is being used differ from segment to segment, it is plausible that comparison may be difficult in the example of FIG. 15. Thus, in the example illustrated in FIGS. 16 and 17, the control mode setting unit 69 refers to the database given as an example in Table 1, and extracts the segments with the matching road conditions, to determine the effect of stabilizing the behavior of the vehicle 10. In a case with multiple combinations of the segments with the matching road conditions, the control mode setting unit 69 may determine the behavior stability of the vehicle 10 for whichever combination includes the larger number of the segments with the matching road condition. In one example, as illustrated in FIG. 16, in a case with a combination of segments A-1 to A-3 with the matching road condition and a combination of segments B-1 to B-4 with the matching road condition, the control mode setting unit 69 selects the combination of the segments B-1 to B-4 with the matching road condition.

FIG. 17 illustrates the index value in each of the segments B-1 to B-4 with the matching road condition, and an approximate line that indicates the change in the index value. The index value is the maximum value of the lateral jerk. In the example illustrated in FIG. 17, the index value becomes smaller as the time of use of the current control mode becomes longer, and the control mode setting unit 69 determines the presence of the effect of stabilizing the behavior of the vehicle 10. In this case, the control mode setting unit 69 may determine the presence of the effect of stabilizing the behavior of the vehicle 10 in a case where a slope of the approximate line that indicates the change in the index value is smaller than a preset threshold, i.e., in a case where the slope of the approximate line is larger to negative side than the preset threshold.

In a case with a determination of the presence of the effect of stabilizing the behavior of the vehicle 10 while the current control mode is set (S65/Yes), it is not determined that the user is accustomed to the auditory stimulation control in the current control mode, and there is no need to change the control mode. Accordingly, the control mode setting unit 69 maintains the setting of the current control mode (step S67). In contrast, in a case without the determination of the presence of the effect of stabilizing the behavior of the vehicle 10 while the current control mode is set (S65/No), it is plausible that the user is accustomed to the auditory stimulation control in the current control mode. Thus, the control mode setting unit 69 switches the setting of the control mode (step S69).

As described, the control mode setting unit 69 sets the control mode using one or more of the driving environment of the vehicle 10, the driver's motivation to improve the driving operation skill, the driver's driving habit, the driver's previous use history of the auditory stimulation control, and the accustomedness to the auditory stimulation, as the determination condition. An alternative configuration may be possible in which the driver is allowed to select which determination condition to use to set the control mode. Moreover, each of the determination conditions may be weighted, and the control mode may be west using multiple determination conditions.

It is to be noted that minimum time for which the single control mode is used, or a minimum travel distance in which the single control mode is used may be set. This makes it possible to prevent the control mode from being switched in a short time and prevent the driver from being confused. Moreover, in switching the control mode, the control mode setting unit 69 may give notification to the driver in advance. This makes it possible to prevent the driver from being confused. At this occasion, in switching the control mode, the control mode setting unit 69 may request the driver to give an approval, and switch the control mode after the driver's approval is given.

Referring back to FIG. 10, after an end of the processing of setting the control mode, the first output processing unit 65 determines whether or not the setting of the control mode is the first output control mode (step S5). In a case where the setting of the control mode is the first output control mode (S5/Yes), the first output processing unit 65 carries out the auditory stimulation control in the first output control mode (step S7). In the following, an example of the auditory stimulation control in the first output control mode is described.

[Processing in First Output Control Mode]

Figure 18:
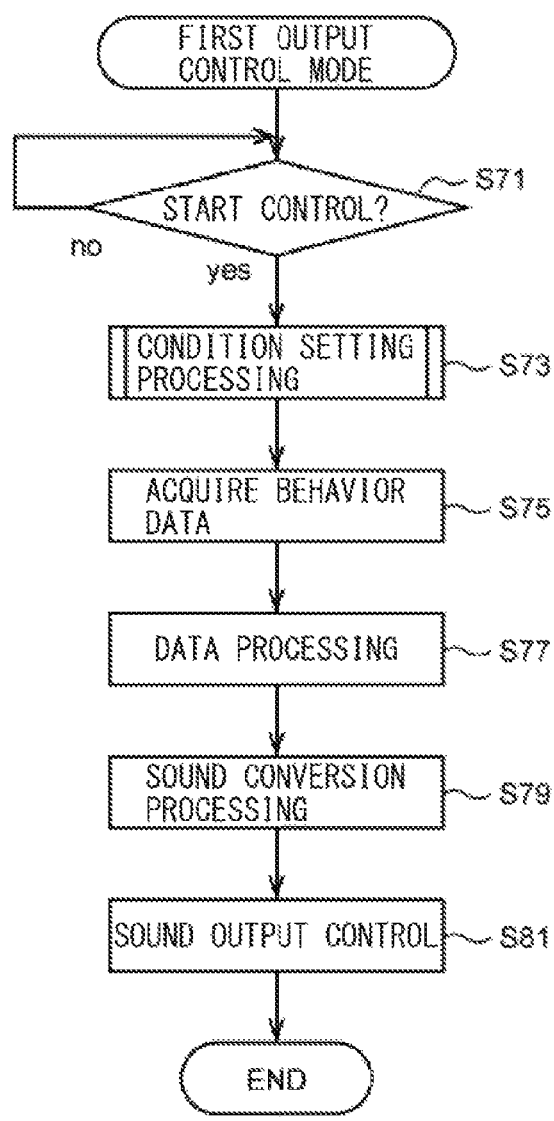
FIG. 18 is a flowchart of control processing in the first output control mode, by the driver assistance apparatus according to the embodiment.

FIG. 18 is a flowchart illustrating a main routine of auditory stimulation control processing in the first output control mode.

First, the first output processing unit 65 determines whether or not to start the auditory stimulation control in the first output control mode (step S71). In a case where the control mode is not set to the first output control mode (S71/No), the first output processing unit 65 repeats the determination of step S71. In a case where the control mode is set to the first output control mode (S71/Yes), the first output processing unit 65 carries out the condition setting processing (step S73).

Figure 19:
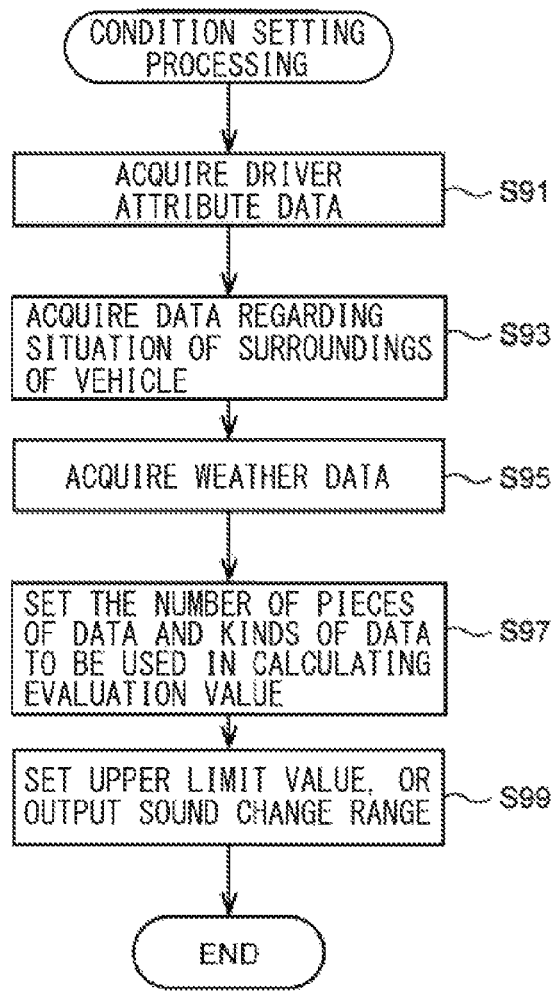
FIG. 19 is a flowchart of condition setting processing in the first output control mode, by the driver assistance apparatus according to the embodiment.

FIG. 19 is a flowchart illustrating the condition setting processing. As illustrated in FIG. 19, in the condition setting processing, first, the acquisition unit 61 acquires the driver attribute data transmitted from the input unit 19 (step S91). For example, the acquisition unit 61 acquires, for example, any one or more of: the age of the driver; the number of years since licensing; how often the driver drives; and the number of years elapsed after a previous drive. These pieces of data may include the data inputted in the form of the questionnaire in which, for example, the driver answers the questions presented by the data processing device 50, or may include the data in which the data obtained by determining or accumulating these pieces of data in advance is inputted. Furthermore, the acquisition unit 61 may acquire, from the storage 55, the data regarding the evaluation of the previous driving operation states related to the same driver.

The acquisition unit 61 acquires the vehicle surrounding situation data inputted from the vehicle surrounding situation detection device 13 (step S93). For example, the acquisition unit 61 acquires the data regarding, for example, other vehicles around the vehicle, bicycles, pedestrians, road signs, and other obstacles, and the data regarding the distances and the relative speeds to these objects. Moreover, the acquisition unit 61 may acquire the data regarding the road width.

Thereafter, the acquisition unit 61 acquires the weather data in the travel area of the vehicle outputted from the weather data detection device 15 (step S95). For example, the acquisition unit 61 acquires the data regarding the amount of rainfall, the amount of snowfall, the wind speed, the wind direction, and the frozen road surface.

Thereafter, the first output processing unit 65 sets the number of pieces and the kinds of the data to be used in calculating the index value that reflects the magnitude of the behavior of the vehicle 10, on the basis of the driver attribute data acquired, the vehicle surrounding situation data, and the weather data in the travel area of the vehicle (step S97). In this embodiment, the number of pieces of the data to be used in calculating the index value is set in accordance with the setting example summarized in FIG. 3. For example, the available data is assumed to include the following 12 pieces of data: the longitudinal acceleration rate; the lateral acceleration rate; the vertical acceleration rate; the angular velocity of the yaw angle; the angular velocity of the pitch angle; the angular velocity of the roll angle; the longitudinal jerk; the lateral jerk; the vertical jerk; the angular acceleration rate of the yaw angle; the angular acceleration rate of the pitch angle; and the angular acceleration rate of the roll angle. The first output processing unit 65 sets the number of pieces of the data to be used in calculating the index value from among these pieces of data.

In the setting example summarized in FIG. 3, the number of pieces of the data to be used is increased as the driver's driving skill estimated on the basis of the driver attribute data is high. The number of pieces of the data to be used is reduced as the driver's driving skill estimated is low. Moreover, in the setting example summarized in FIG. 3, the number of pieces of the data to be used is increased as the traveling environment estimated on the basis of the vehicle surrounding situation data and the weather data is the traveling environment in which the enhanced behavior stability of the vehicle is more desirable, or the traveling environment in which the behavior stability of the vehicle lowers more easily. For example, the first output processing unit 65 sets the minimum value to 1, sets the maximum value to 12, and sets a reference value to 5. The first output processing unit 65 adds or subtracts 1 for each piece of the data to or from 5 as the reference value, to set the number of pieces of the data to be used. At this occasion, the first output processing unit 65 sets, as prioritized data, the longitudinal jerk, the lateral jerk, the angular acceleration rate of the yaw angle, and the angular acceleration rate of the pitch angle. The prioritized data reflects the influence of the driver's driving operation state more. Alternatively, the first output processing unit 65 may set, as the data to be used, data corresponding to behavior to be evaluated. The behavior to be evaluated includes either the longitudinal behavior or the lateral behavior of the vehicle body.

Thereafter, the first output processing unit 65 sets the upper limit value lim of the output sound change range on the basis of the driver attribute data acquired, the vehicle surrounding situation data, and the weather data in the travel area of the vehicle (step S99). In this embodiment, the upper limit value lim of the output sound change range is set in accordance with the setting example summarized in FIG. 3. In this embodiment, to evaluate the magnitude of the behavior of the vehicle 10 using one or more pieces of the data, each piece of the data to be used is replaced with the same index, e.g., the index value of 0 to 100 both inclusive. The average value for all pieces of the data to be used is set as the index value. Thus, the upper limit value lim is set from among five stages of, for example, 30, 40, 50, 60, and 70 by adding or subtracting 10 for each piece of the data to or from a reference value of 50. However, the method of calculating the index value, and the set value of the upper limit value lim in the case with the use of multiple pieces of the data are not limited to this example.

In the setting example summarized in FIG. 3, the upper limit value lim is set to a smaller value as the driver's driving skill estimated on the basis of the driver attribute data is higher. The upper limit value lim is set to a larger value as the driver's driving skill estimated is lower. Moreover, in the setting example summarized in FIG. 3, the upper limit value lim is set to a smaller value as the traveling environment estimated on the basis of the vehicle surrounding situation data and the weather data is the traveling environment in which the enhanced behavior stability of the vehicle is more desirable, or the traveling environment in which the behavior stability of the vehicle lowers more easily.

Referring back to FIG. 18, after carrying out the condition setting processing in step S73, the acquisition unit 61 acquires the data indicating the behavior of the vehicle 10 transmitted from the vehicle body behavior measurement device 11 (step S75). In this embodiment, the acquisition unit 61 acquires the data regarding the vehicle speed, the longitudinal acceleration rate, the lateral acceleration rate, the vertical acceleration rate, the angular velocity of the roll angle, the angular velocity of the pitch angle, and the angular velocity of the yaw angle.

Thereafter, the data processing unit 63 carries out the smoothing process, the absolute value conversion process, and the differentiation process on each piece of the acquired data, and calculates the index value indicating the magnitude of the behavior of the vehicle 10 (step S77). At this occasion, the data processing unit 63 may carry out the data processing on the number of pieces and the kinds of the data set in the condition setting processing in step S73, and calculate the index value. Alternatively, the data processing unit 63 may carry out the data processing on all pieces of the data indicating the magnitude of the behavior of the vehicle 10, and calculate the index value using the number of pieces and the kinds of the data set in the condition setting processing in step S73. Moreover, in this embodiment, the data processing unit 63 replaces each piece of the data to be used, with the same index, e.g., the index value of 0 to 100 both inclusive. The data processing unit 63 sets, as the index value, the average value for all pieces of the data to be used.

Thereafter, the first output processing unit 65 converts the calculated index value into the output sound data (step S79). In one example, the first output processing unit 65 sets the output sound change range in accordance with the upper limit value lim set in the condition setting processing in step S73, and assigns the setting of the change element of the output sound for each index value. In this embodiment, the piano sound is used as the tone of the output sound, and the first output processing unit 65 assigns the index value to each note of the preset musical scale. In one example, in the region in which the index value is equal to or smaller than the lower limit value of the output sound change range, the first output processing unit 65 sets the pitch of the output sound to the lowest note of the musical scale. In the region in which the index value is equal to or larger than the upper limit value of the output sound change range, the first output processing unit 65 sets the pitch of the output sound to the highest note of the musical scale. In the case where the index value is within the output sound change range, the first output processing unit 65 assigns the index value to each note of the musical scale corresponding to each key between the lowest note and the highest note of the musical scale. The first output processing unit 65 sets the pitch corresponding to the index value calculated in step S77, to the pitch of the piano sound to be outputted.

Thereafter, the first output processing unit 65 controls the driving of the sound output device 31 on the basis of the output sound data set in step S79, and causes the piano sound of the set pitch to be outputted (step S81). Thus, the driver is presented with the evaluation of the driving operation state as an audible sound in real time. Because the output sound does not include any text data by voice or display, it is possible to give the driver the intuitive recognition of the evaluation of the driving operation state. Hence, it is possible to suppress the driver's attention from being distracted.

As described, in the auditory stimulation control in the first output control mode, the data indicating the behavior of the vehicle 10 is acquired, and the sound that changes with the behavior is continuously outputted during the travel of the vehicle. At this occasion, the upper limit value, or the threshold, is set for the index value indicating the magnitude of the behavior on the basis of the driving condition of the vehicle. In the case where the index value is smaller than the upper limit value, the sound continuously changes with the index value. In the case where the index value is equal to or larger than the upper limit value, the constant sound is outputted. Accordingly, it is possible to give the driver the real-time recognition of the evaluation of the driving operation state during a drive. Moreover, because the output sound does not include any text data by voice or display, it is possible to give the driver the intuitive recognition of the data regarding the driving operation state through the auditory stimulation. This suppresses the driver's attention from being distracted.

Moreover, in the auditory stimulation control in the first output control mode, the change element of the output sound changes with the change in the index value. Hence, it is possible to give the driver the intuitive recognition of the change in the behavior stability of the vehicle 10. In particular, as the index value increases, the pitch or the frequency of the output sound becomes higher, the volume becomes larger, the tempo becomes faster, or the number of the tones in the chord is reduced, in the output sound change range. This makes it possible to give the driver the intuitive recognition that the stability of the vehicle body is lowering. Furthermore, in the driver assistance apparatus 1 according to this embodiment, in the case where the index value is equal to or larger than the upper limit value, the constant sound is outputted. Hence, it is possible to give the driver the intuitive recognition that the behavior stability of the vehicle 10 is lowered.

Moreover, in the auditory stimulation control in the first output control mode, the upper limit value is set on the basis of the driver attribute data regarding the driver's driving skill. In particular, the higher the driver's driving skill, the lower the upper limit value. The lower the driver's driving skill, the higher the upper limit value. Hence, for the driver having the high driving skill, it is possible to lead the driver to the driving operation state in which the behavior stability of the vehicle 10 is more enhanced. For the driver having the low driving skill, it is possible to lead the driver to the appropriate level of the behavior stability, depending on the driver's driving skill.

Furthermore, in the auditory stimulation control in the first output control mode, the upper limit value is set on the basis of the data regarding the traveling environment that influences the behavior stability of the vehicle. In particular, the upper limit value is lowered in the traveling environment in which the enhanced behavior stability of the vehicle is more desirable, or in the traveling environment in which the behavior stability of the vehicle lowers more easily. Hence, it is possible to bring the driver's driving operation state into the driving operation state in which the behavior stability of the vehicle 10 is more enhanced.

In the auditory stimulation control in the first output control mode, the auditory stimulation control is stopped in the traveling environment in which the behavior stability of the vehicle lowers. This makes it possible to avoid presenting the driver with the inaccurate evaluation. It is also possible prevent the driver's driving operation from being brought into the inappropriate operation state on the basis of the inaccurate evaluation.

Referring back to FIG. 10, in step S5, in a case where the control mode is not set to the first output control mode (S5/No), the second output processing unit 67 determines whether or not the control mode is set to the second output control mode (step S9). In a case where the setting of the control mode is the second output control mode (S9/Yes), the second output processing unit 67 carries out the auditory stimulation control in the second output control mode (step S11). In the following, an example of the auditory stimulation control in the second output control mode is described.

[Processing in Second Output Control Mode]

Figure 20:
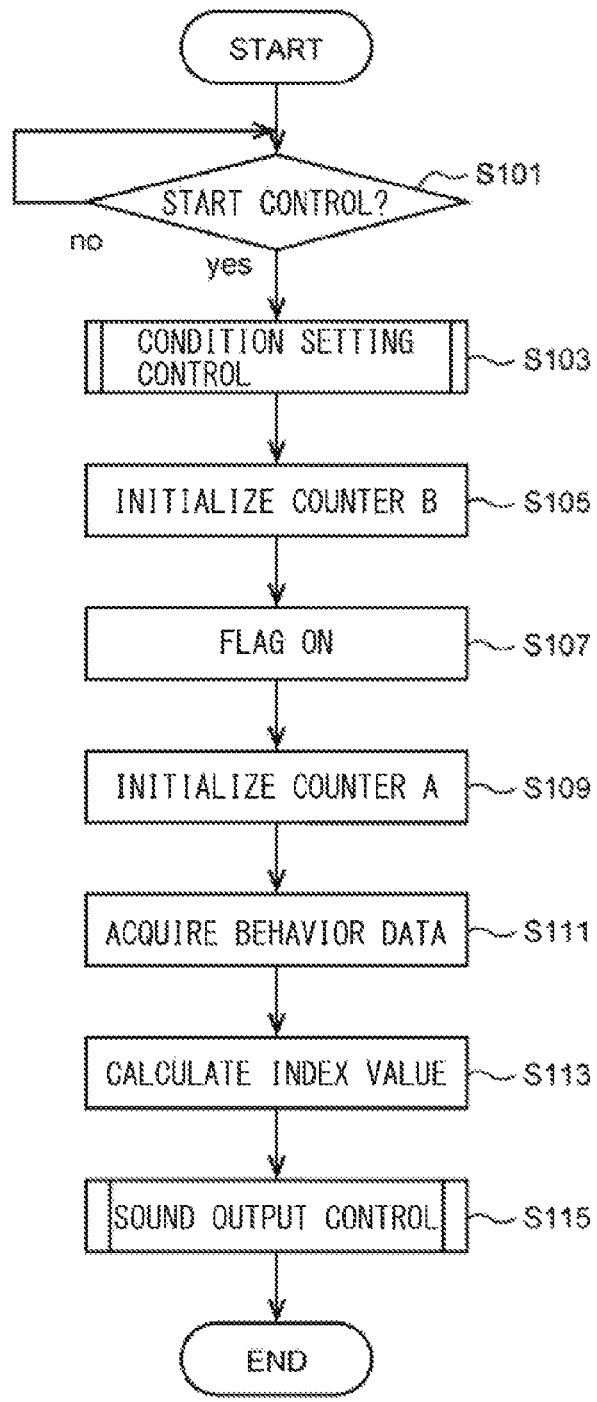
FIG. 20 is a flowchart of control processing in the second output control mode, by the driver assistance apparatus according to the embodiment.

FIG. 20 is a flowchart illustrating a main routine of the auditory stimulation control processing in the second output control mode. In the following, an example is described in which, each time the vehicle travels through the segment separated off by the predetermined time, the index value is compared with the first threshold thre1 and the second threshold thre2 to generate the reward sound.

First, the second output processing unit 67 determines whether or not to start the auditory stimulation control in the second output control mode (step S101). In a case where the control mode is not set to the second output control mode (S101/No), the second output processing unit 67 repeats the determination of step S101. In a case where the control mode is set to the second output control mode (S101/Yes), the second output processing unit 67 carries out the condition setting processing (step S103).

Figure 21:
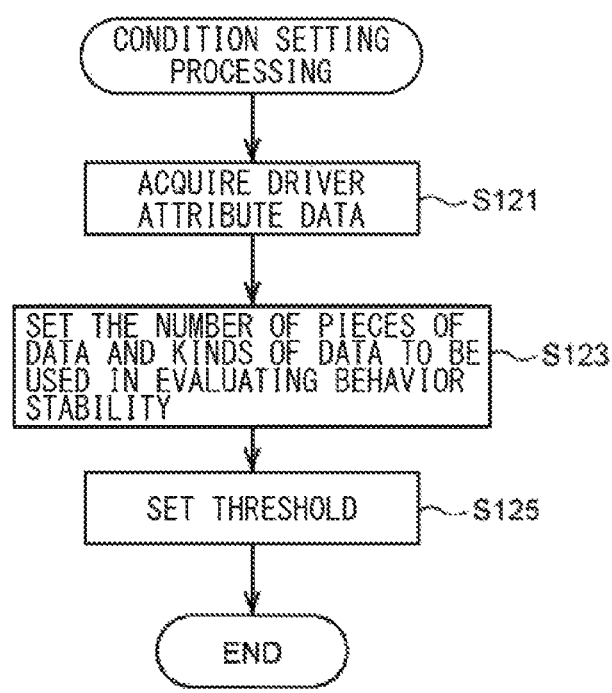
FIG. 21 is a flowchart of condition setting processing in the second output control mode, by the driver assistance apparatus according to the embodiment.

FIG. 21 is a flowchart illustrating the condition setting processing. As illustrated in FIG. 21, in the condition setting processing, first, the acquisition unit 61 acquires the driver attribute data transmitted from the input unit 19 (step S121). For example, the acquisition unit 61 acquires, for example, any one or more of: the age of the driver; the number of years since licensing; how often the driver drives; and the number of years elapsed after a previous drive. These pieces of data may include the data inputted in the form of the questionnaire in which, for example, the driver answers the questions presented by the data processing device 50, or may include the data in which the data obtained by determining or accumulating these pieces of data in advance is inputted. Furthermore, the acquisition unit 61 may acquire, from the storage 55, the data regarding the evaluation of the previous driving operation state related to the same driver.

Thereafter, the second output processing unit 67 sets the number of pieces and the kinds of the data to be used in evaluating the behavior stability of the vehicle 10 on the basis of the driver attribute data acquired (step S123). In this embodiment, the number of pieces of the data to be used in evaluating the behavior stability is set in accordance with the setting example summarized in FIG. 3. For example, the available data is assumed to include the following 12 pieces of data: the longitudinal acceleration rate; the lateral acceleration rate; the vertical acceleration rate; the angular velocity of the yaw angle; the angular velocity of the pitch angle; the angular velocity of the roll angle; the longitudinal jerk; the lateral jerk; the vertical jerk; the angular acceleration rate of the yaw angle; the angular acceleration rate of the pitch angle; and the angular acceleration rate of the roll angle. The second output processing unit 67 sets the number of pieces of the data to be used in evaluating the behavior stability, from among these pieces of data.

In the setting example summarized in FIG. 3, the number of pieces of the data to be used is increased as the driver's driving skill estimated on the basis of the driver attribute data is higher. The number of pieces of the data to be used is decreased as the driver's driving skill estimated is lower. For example, the second output processing unit 67 sets the minimum value to 1, sets the maximum value to 12, and sets a reference value to 5. The second output processing unit 67 adds or subtracts 1 for each piece of the data to or from 5 as the reference value, to set the number of pieces of the data to be used. At this occasion, the second output processing unit 67 sets, as the prioritized data, the longitudinal jerk, the lateral jerk, the angular acceleration rate of the yaw angle, and the angular acceleration rate of the pitch angle. The prioritized data reflects the influence of the driver's driving operation state more. Alternatively, the second output processing unit 67 may set, as the data to be used, the data corresponding to the behavior to be evaluated. The behavior to be evaluated includes either the longitudinal behavior or the lateral behavior of the vehicle body.

Thereafter, the second output processing unit 67 sets the first threshold thre1 and the second threshold thre2 on the basis of the driver attribute data acquired (step S125). In this embodiment, the first threshold thre1 and the second threshold thre2 are set in accordance with the setting example summarized in FIG. 3. In this embodiment, to calculate one index value using one or more pieces of the data, each piece of the data to be used is replaced with the same index, e.g., the value of 0 to 100 both inclusive. The average value of the values of all pieces of the data to be used is set as the index value. The second output processing unit 67 sets the reference value of the first threshold thre1 to 30, sets the reference value of the second threshold thre2 to 60, and obtains the first threshold thre1 and the second threshold thre2 by multiplying the reference values of the first threshold thre1 and the second threshold thre2 by a coefficient larger than 1 or a coefficient smaller than 1 for each piece of the data. However, the method of determining the index value with the use of multiple pieces of the data, and the method of setting the first threshold thre1 and the second threshold thre2 are not limited to this example.

In the setting example summarized in FIG. 3, the first threshold thre1 and the second threshold thre2 are set to smaller values as the driver's driving skill estimated on the basis of the driver attribute data is higher. The first threshold thre1 and the second threshold thre2 are set to larger values as the driver's driving skill estimated is lower.

Referring back to FIG. 20, in step S103, after carrying out the condition setting processing, the second output processing unit 67 initializes a counter B configured to count the number of consecutive segments where the behavior stability of the vehicle 10 is the same (step S105). The number of the consecutive segments where the behavior stability of the vehicle 10 is the same is, for example, the number of consecutive segments where the index value is equal to or smaller than the first threshold thre1, the number of consecutive segments where the index value exceeds the first threshold thre1 and is equal to or smaller than the second threshold thre2, or the number of consecutive segments where the index value exceeds the second threshold thre2. In a case where a count value of the counter B reaches a preset count value C2, the second output processing unit 67 is set to output a sound effect different from the reward sound, e.g., a fanfare.

Thereafter, the second output processing unit 67 turns ON a flag provided for determining whether or not the index value exceeds the first threshold thre1 in each segment (step S107). The flag being ON indicates that the index value does not exceed the first threshold thre1. The flag being OFF indicates that the index value exceeds the first threshold thre1.

Thereafter, the second output processing unit 67 initializes a counter A configured to measure the travel time in each segment (step S109). In a case where a count value of the counter A reaches a preset count value C1, the second output processing unit 67 is set to determine that the vehicle has finished the travel through the predetermined segment.

Thereafter, the acquisition unit 61 acquires the data indicating the behavior of the vehicle 10 transmitted from the vehicle body behavior measurement device 11 (step S111). In this embodiment, the acquisition unit 61 acquires the data regarding the vehicle speed, the longitudinal acceleration rate, the lateral acceleration rate, the vertical acceleration rate, the angular velocity of the roll angle, the angular velocity of the pitch angle, and the angular velocity of the yaw angle.

Thereafter, the data processing unit 63 carries out the smoothing process, the absolute value conversion process, and the differentiation process on each piece of the data acquired, and calculates the index value indicating the magnitude of the behavior of the vehicle 10 (step S113). At this occasion, the data processing unit 63 may carry out the data processing on the number of pieces and the kinds of the data set in the condition setting processing of step S103, and calculate the index value. Alternatively, the data processing unit 63 may carry out the data processing on all pieces of the data indicating the magnitude of the behavior of the vehicle 10, and calculate the index value using the number of pieces and the kinds of the data set in the condition setting processing of step S103. Moreover, in this embodiment, the data processing unit 63 replaces each piece of the data to be used, with the same index, e.g., the value of 0 to 100 both inclusive. The data processing unit 63 sets, as the index value, the average value for all the pieces of the data to be used.

Thereafter, the second output processing unit 67 carries out the control of converting the calculated index value into the output sound data and outputting the sound (step S115).

Figure 22:
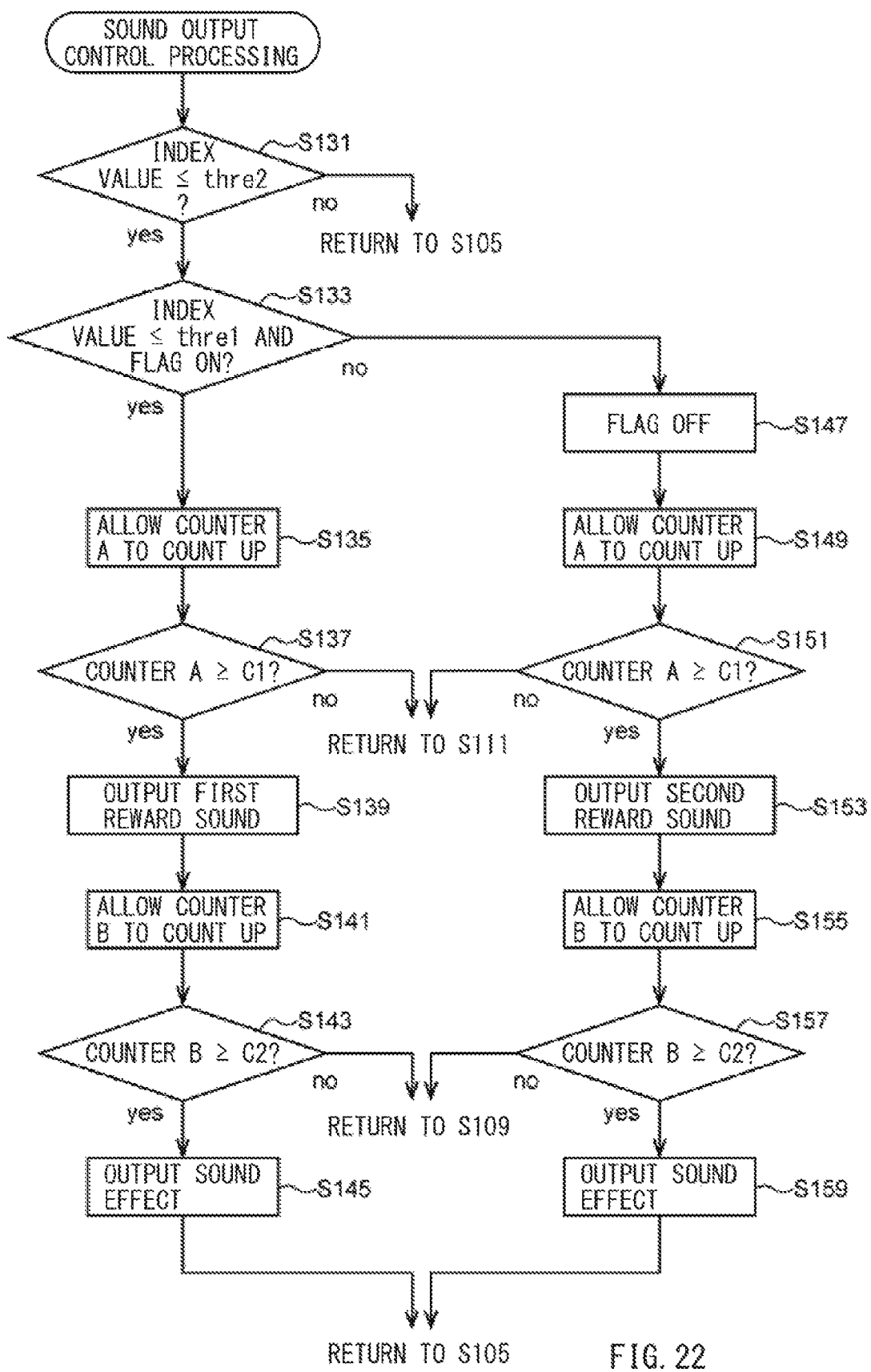
FIG. 22 is a flowchart of sound output control processing in the second output control mode, by the driver assistance apparatus according to the embodiment.

FIG. 22 is a flowchart illustrating an example of the processing of outputting the sound on the basis of the index value in the second output control mode. As illustrated in FIG. 22, first, the second output processing unit 67 determines whether or not the index value obtained by the data processing unit 63 in step S113 is equal to or smaller than the second threshold thre2 (step S131). In a case where the index value exceeds the second threshold thre2 (S131/No), the second output processing unit 67 causes the flow to return to step S105 without switching ON or OFF the flag or allowing the counter A and the counter B to count up.

In a case where the index value is equal to or smaller than the second threshold thre2 (S131/Yes), the second output processing unit 67 determines whether or not the index value is equal to or smaller than the first threshold thre1 and the flag is ON (step S133). In a case where the index value is equal to or smaller than the first threshold thre1 and the flag is ON (S133/Yes), the second output processing unit 67 allows the counter A to count up (step S135). Thereafter, the second output processing unit 67 determines whether or not the count value of the counter A has reached the preset count value C1 (step S137). In step S137, the second output processing unit 67 determines whether or not the vehicle has finished the travel through the predetermined segment, on the basis of whether or not the count value of the counter A has reached the count value C1.

In a case where the count value of the counter A is smaller than the count value C1 (S137/No), that is, in a case where the vehicle has not finished the travel through the current segment, the flow returns to step S111, and repeats the acquisition of the measurement data, the calculation of the index value, and the evaluation of the index value while the driving of the vehicle is continued. In a case where the count value of the counter A has reached the count value C1 (S137/Yes), the second output processing unit 67 sets the reward sound to the first reward sound (step S139) because the maximum value of the index value in the segment traveled this time is equal to or smaller than the first threshold thre1. Thus, the second output processing unit 67 controls the driving of the sound output device 31 to generate the first reward sound.

Thereafter, the second output processing unit 67 allows the counter B to count up (step S141). Thereafter, the second output processing unit 67 determines whether or not the count value of the counter B has reached the preset count value C2 (step S143). In step S143, the second output processing unit 67 determines whether or not the number of the consecutive segments where the maximum value of the index value is equal to or smaller than the first threshold thre1 is equal to or larger than a predetermined value, i.e., the count value C2, on the basis of whether or not the count value of the counter B has reached the count value C2.

In a case where the count value of the counter B is smaller than the count value C2 (S143/No), the flow returns to step S109. Thus, the counter A is reset, and the processes of step S109 and subsequent steps are carried out. In a case where the count value of the counter B has reached the count value C2 (S143/Yes), the number of the consecutive segments where the maximum value of the index value is equal to or smaller than the first threshold thre1 is equal to or larger than the predetermined value. Accordingly, the second output processing unit 67 sets the output sound to the sound effect different from the reward sound, e.g., the fanfare (step S145) Thus, the second output processing unit 67 controls the driving of the sound output device 31 to generate the sound effect. After the sound effect is generated, the flow returns to step S105. Thus, the counter B is reset, and the processes of step S105 and subsequent steps are carried out.

Meanwhile, in step S153 mentioned above, in a case where the index value exceeds the first threshold thre1 or the flag is OFF (S153/No), the second output processing unit 67 turns OFF the flag (step S147). This indicates that the maximum value of the index value in the currently traveled segment is not equal to or smaller than the first threshold thre1, that is, exceeds the first threshold thre1 and is smaller than the second threshold thre2. Thereafter, the second output processing unit 67 allows the counter A to count up (step S149). Thereafter, the second output processing unit 67 determines whether or not the count value of the counter A has reached the preset count value C1 (step S151). In step S151, the second output processing unit 67 determines whether or not the vehicle has finished the travel through the predetermined segment, on the basis of whether or not the count value of the counter A has reached the count value C1.

In a case where the count value of the counter A is smaller than the count value C1 (S151/No), that is, in a case where the vehicle has not finished the travel through the current segment, the flow returns to step S111, and repeats the acquisition of the measurement data, the calculation of the index value, and the evaluation of the index value while the driving of the vehicle is continued. Meanwhile, in a case where the count value of the counter A has reached the count value C1 (S151/Yes), the maximum value of the index value in the segment traveled this time exceeds the first threshold thre1 and is equal to or smaller than the second threshold thre2. Accordingly, the second output processing unit 67 sets the reward sound to the second reward sound (step S153). Thus, the second output processing unit 67 controls the driving of the sound output device 31 to generate the second reward sound.

Thereafter, the second output processing unit 67 allows the counter B to count up (step S155). Thereafter, the second output processing unit 67 determines whether or not the count value of the counter B has reached the preset count value C2 (step S157). In step S157, the second output processing unit 67 determines whether or not the number of the consecutive segments where the maximum value of the index value exceeds the first threshold thre1 and is equal to or smaller than the second threshold thre2 is equal to or larger than the predetermined value, i.e., the count value C2, on the basis of whether or not the count value of the counter B has reached the count value C2.

In a case where the count value of the counter B is smaller than the count value C2 (S157/No), the flow returns to step S109. Thus, the counter A is reset, and the processes of step S109 and subsequent steps are carried out. In a case where the count value of the counter B has reached the count value C2 (S157/Yes), the number of the consecutive segments where the maximum value of the index value exceeds the first threshold thre1 and is equal to or smaller than the second threshold thre2 is equal to or larger than the predetermined value. Accordingly, the second output processing unit 67 sets the output sound to the sound effect different from the reward sound, e.g., the fanfare (step S159). Thus, the second output processing unit 67 controls the driving of the sound output device 31 to generate the sound effect.

In one example, the sound effect to be set may be a sound effect different from the sound effect to be set in step S145 in which the number of the consecutive segments where the maximum value of the index value is equal to or smaller than the first threshold thre1 is equal to or larger than the predetermined value. The difference in the sound effects makes it possible to give the driver a recognition as to which level of the behavior stability has continued over the predetermined number of the consecutive segments. After the sound effect is generated, the flow returns to step S105. Thus, the counter B is reset, and the processes of step S105 and subsequent steps are carried out.

As described, in the auditory stimulation control in the second output control mode, the data indicating the behavior of the vehicle 10 is acquired during the travel of the vehicle. Each time the vehicle travels through the predetermined segment, the reward sound corresponding to the behavior stability is outputted on the basis of the data regarding the behavior stability obtained from the acquired data. Hence, it is possible to give the driver the real-time recognition of the driving operation state during the travel through the predetermined segment, while the driver is driving. Moreover, the output sound does not include any text data by voice or display. This makes it possible to give the driver the intuitive recognition of the data regarding the driving operation state through the auditory stimulation, while suppressing the driver's attention from being distracted. Furthermore, the output sound is the reward sound that gives the driver the sense of achievement. Hence, it is possible to motivate the driver to make the driving operation that stabilizes the behavior of the vehicle 10 more.

In the auditory stimulation control in the second output control mode, any one or more of the following are set on the basis of the data indicating the behavior stability in the predetermined segment: the number of times the reward sound is outputted; the pitch of the reward sound; the volume of the reward sound; the kind of the reward sound; the number of the notes included in the reward sound; or the tempo of the reward sound. Hence, it is possible to give the driver the intuitive recognition of the level of the behavior stability.

Moreover, in the auditory stimulation control in the second output control mode, the reward sound may be controlled, with the maximum value of the index value serving as the data indicating the behavior stability. The maximum value of the index value is obtained from the measurement data acquired during the travel through the predetermined segment. In this case, the driving operation state is evaluated on the basis of the magnitude of the behavior when the behavior of the vehicle 10 becomes most unstable in each segment.

Furthermore, in the auditory stimulation control in the second output control mode, the index value obtained from the measurement data acquired during the travel through the predetermined segment is compared with the predetermined threshold. The reward sound is outputted, with the number of times the index value exceeds the predetermined threshold serving as the data regarding the behavior stability. This makes it possible to avoid evaluating the behavior stability of the vehicle 10 on the basis of the index value when the index value exceeds the threshold only once. Hence, it is possible to evaluate the behavior stability over the entire segment.

In the auditory stimulation control in the second output control mode, the threshold is set on the basis of the driver attribute data regarding the driver's driving skill. In particular, the higher the driver's driving skill, the smaller the threshold. The lower the driver's driving skill, the larger the threshold. Hence, as for the driver with the high driving skill, it is possible to lead the driver to the driving operation state that enhances the behavior stability of the vehicle 10 more. As for the driver with the low driving skill, it is possible to lead the driver to the appropriate level of the behavior stability, depending on the driver's driving skill.

In the auditory stimulation control in the second output control mode, the auditory stimulation control is stopped in the traveling environment in which the behavior stability of the vehicle 10 lowers. Hence, it is possible to avoid presenting the driver with the inaccurate evaluation. It is also possible to prevent the driver's driving operation from being brought into the inappropriate operation state on the basis of the inaccurate evaluation.

Referring back to FIG. 10, the processor 53 determines whether or not to end the execution of the auditory stimulation control (step S15). There is no particular limitation on the condition that the execution of the auditory stimulation control is to be ended. For example, in the case where the auditory stimulation control is carried out constantly while the driving system of the vehicle is in operation, the processor 53 may determine that the execution of the auditory stimulation control is to be ended when the driving system is stopped. Alternatively, the processor 53 may determine that the execution of the auditory stimulation control is to be ended upon detecting the driver having left the driver's seat. In a case where an occupant such as a driver is allowed to switch on or off the execution of the auditory stimulation control, the processor 53 may determine that the execution of the auditory stimulation control is to be ended when the execution of the auditory stimulation control is switched off, from a switch-on state.

In a case where the execution of the auditory stimulation control is not to be ended (S15/No), the flow returns to step S3, and the processor 53 repeatedly carries out the processes of steps described above. In a case where the execution of the auditory stimulation control is to be ended (S15/Yes), the processor 53 stops the auditory stimulation control processing.

4. Effects of Embodiment

As described, the driver assistance apparatus 1 according to this embodiment is configured to selectively use the first output control mode and the second output control mode, depending on the situation. The first output control mode includes outputting the sound that gives the driver the intuitive recognition of the behavior instability of the vehicle 10. The second output control mode includes outputting the reward sound that gives the driver the intuitive recognition that the behavior stability of the vehicle 10 is high. This makes it possible to select, depending on the situation, the control mode that is highly effective in stabilizing the behavior of the vehicle 10. Hence, it is possible to bring the driver's driving operation into the driving operation state in which the behavior stability of the vehicle 10 is more enhanced.

The driver assistance apparatus 1 sets the control mode to the first output control mode or the second output control mode on the basis of one or more of the following as the determination condition: the driving environment of the vehicle 10; the driver's motivation to improve the driving operation skill; the driver's driving habit; the driver's previous use history of the auditory stimulation control; and the accustomedness to the auditory stimulation. Hence, it is possible to set the optimum control mode from various viewpoints such as the driving environment, the driver's habit, and performance of improving the behavior stability.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the following embodiments also fall within the scope of the disclosure.

(A) The driver assistance apparatus in which the processors are configured to switch the control mode between the first output control mode and the second output control mode, on the basis of time of use of the same control mode or a travel distance in the same control mode, as the predetermined determination condition.

(B) The driver assistance apparatus in which, in a case where the control mode is set to the first output control mode, the processors are configured to output the sound that changes continuously with a change in the magnitude of the behavior.

(C) The driver assistance apparatus in which, in a case where the control mode is set to the second output control mode, the processors are configured to set any one or more of: the number of times the reward sound is outputted; a pitch of the reward sound; a volume of the reward sound; the kind of the reward sound; the number of notes included in the reward sound; or a tempo of the reward sound, on the basis of the stability of the behavior in the predetermined segment.

(D) A driver assistance apparatus configured to output a sound corresponding to behavior of a vehicle, the driver assistance apparatus including:

an acquisition unit configured to acquire data indicating behavior of the vehicle;

a first output processing unit configured to carry out processing of outputting the sound in a first output control mode, the first output control mode including outputting the sound continuously during travel of the vehicle while changing the output sound with magnitude of the behavior;

a second output processing unit configured to carry out processing of outputting the sound in a second output control mode, the second output control mode including outputting a reward sound each time the vehicle travels through a predetermined segment of a travel route of the vehicle, the reward sound corresponding to stability of the behavior in the predetermined segment traveled; and a control mode setting unit configured to set a control mode of outputting the sound, to the first output control mode or the second output control mode depending on a predetermined determination condition.

As described, according to the disclosure, it is possible to set a control mode of outputting a sound, appropriately depending on a situation, in consideration of difference in a change in a driver's driving behavior in response to an output sound.

The processor 53 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 53. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 53 illustrated in FIG. 2.

The invention claimed is:

1. A driver assistance apparatus configured to output a sound corresponding to behavior of a vehicle, the driver assistance apparatus comprising:
one or more processors; and one or more memories communicably coupled to the one or more processors, wherein
the one or more processors are configured to
set a control mode of outputting the sound, to a first output control mode or a second output control mode depending on a predetermined determination condition, the first output control mode including outputting the sound continuously during travel of the vehicle, while changing the sound with magnitude of the behavior of the vehicle, and the second output control mode including outputting, each time the vehicle travels through a predetermined segment of a planned travel route of the vehicle, a reward sound corresponding to stability of the behavior of the vehicle in the predetermined segment traveled, and
carry out processing of outputting the sound in the first output control mode or the second output control mode set.

2. The driver assistance apparatus according to claim 1, wherein
on a basis of data regarding driving environment of the vehicle as the predetermined determination condition,
the one or more processors are configured to switch between carrying out the first output control mode, carrying out the second output control mode, and stopping the first output control mode and the second output control mode.

3. The driver assistance apparatus according to claim 1, wherein
on a basis of data regarding motivation of a driver who drives the vehicle to enhance driving skill as the predetermined determination condition,
the one or more processors are configured to
set the control mode to the first output control mode in a case where the one or more processors determine that the motivation to enhance the driving skill is high, and
set the control mode to the second output control mode in a case where the one or more processors determine that the motivation to enhance the driving skill is low.

4. The driver assistance apparatus according to claim 1, wherein
on a basis of data regarding a driving habit of a driver who drives the vehicle as the predetermined determination condition,
the one or more processors are configured to switch between carrying out the first output control mode, carrying out the second output control mode, and stopping the first output control mode and the second output control mode.

5. A non-transitory computer-readable recording medium containing a program applicable to a driver assistance apparatus configured to output a sound corresponding to behavior of a vehicle,
the program causing, when executed by one or more processors, the one or more processors to implement processing, the processing comprising:
setting a control mode of outputting the sound, to a first output control mode or a second output control mode depending on a predetermined determination condition, the first output control mode including outputting the sound continuously during travel of the vehicle, while changing the sound with magnitude of the behavior of the vehicle, and the second output control mode including outputting, each time the vehicle travels through a predetermined segment of a planned travel route of the vehicle, a reward sound corresponding to stability of the behavior of the vehicle in the predetermined segment traveled, and
carrying out processing of outputting the sound in the first output control mode or the second output control mode set.

* * * * *